US010328841B2

(12) United States Patent
Bika et al.

(10) Patent No.: US 10,328,841 B2
(45) Date of Patent: Jun. 25, 2019

(54) AUTOMATED WIRELESS SECUREMENT-MONITORING AND FEEDBACK SYSTEM

(71) Applicants: Anil Singh Bika, Rochester Hills, MI (US); Nathan F. Thompson, Sterling Heights, MI (US); Dorel M. Sala, Troy, MI (US); Kenneth J. Shoemaker, Highland, MI (US); Norman J. Weigert, Whitby (CA)

(72) Inventors: Anil Singh Bika, Rochester Hills, MI (US); Nathan F. Thompson, Sterling Heights, MI (US); Dorel M. Sala, Troy, MI (US); Kenneth J. Shoemaker, Highland, MI (US); Norman J. Weigert, Whitby (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/216,605

(22) Filed: Jul. 21, 2016

(65) Prior Publication Data

US 2017/0129383 A1    May 11, 2017

Related U.S. Application Data

(60) Provisional application No. 62/199,528, filed on Jul. 31, 2015.

(51) Int. Cl.
*B60P 7/08* (2006.01)
*G01L 5/04* (2006.01)
*G01L 5/06* (2006.01)
*H04W 4/70* (2018.01)

(52) U.S. Cl.
CPC ............ *B60P 7/0861* (2013.01); *G01L 5/047* (2013.01); *G01L 5/06* (2013.01); *H04W 4/70* (2018.02)

(58) Field of Classification Search
CPC .............................. B60P 7/0861; H04W 4/005
See application file for complete search history.

(56) References Cited

U.S. PATENT DOCUMENTS

| | | | | |
|---|---|---|---|---|
| 4,027,130 A | * | 5/1977 | Filip | H01H 35/00 200/518 |
| 7,112,023 B1 | * | 9/2006 | Tardif | B60P 7/0861 340/440 |
| 9,422,064 B2 | * | 8/2016 | Zolich | B64D 45/00 |
| 2007/0269285 A1 | * | 11/2007 | Leggett | B60P 7/083 410/100 |
| 2010/0158629 A1 | * | 6/2010 | Morland | B60P 7/0861 410/98 |
| 2011/0006899 A1 | * | 1/2011 | Eide | B60P 7/0861 340/568.1 |

(Continued)

*Primary Examiner* — Nader Bolourchi
(74) *Attorney, Agent, or Firm* — Parks IP Law LLC

(57) ABSTRACT

Methods and systems for receiving, by a destination device at which a securement-monitoring application is operating, from a securement sensor device, a securement-condition communication indicating a condition of a securement remote to the destination device. Operations also include determining, by the destination device using the securement-monitoring application, an action to take responsive to the securement-condition communication, such as notifying a user of an undesired condition at the securement. The operations further include initiating the action determined.

18 Claims, 18 Drawing Sheets

(56) References Cited

U.S. PATENT DOCUMENTS

2013/0162420 A1    6/2013  Stoddard
2016/0253882 A1*  9/2016  Taylor ................ G08B 13/1445
                                                                          340/538.17
2017/0082507 A1*  3/2017  Johnson ............... A61B 5/6892

\* cited by examiner

Fig_3

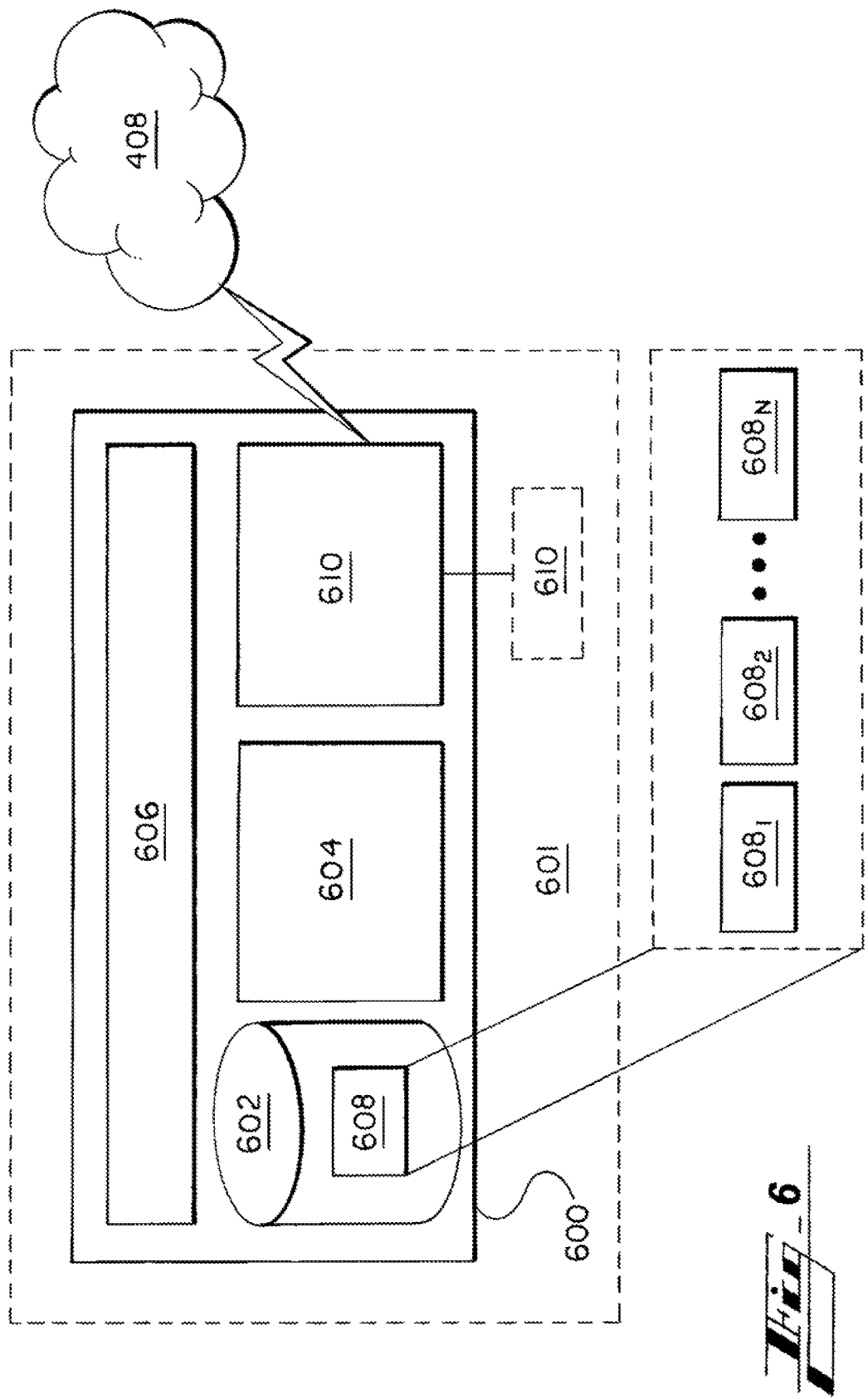

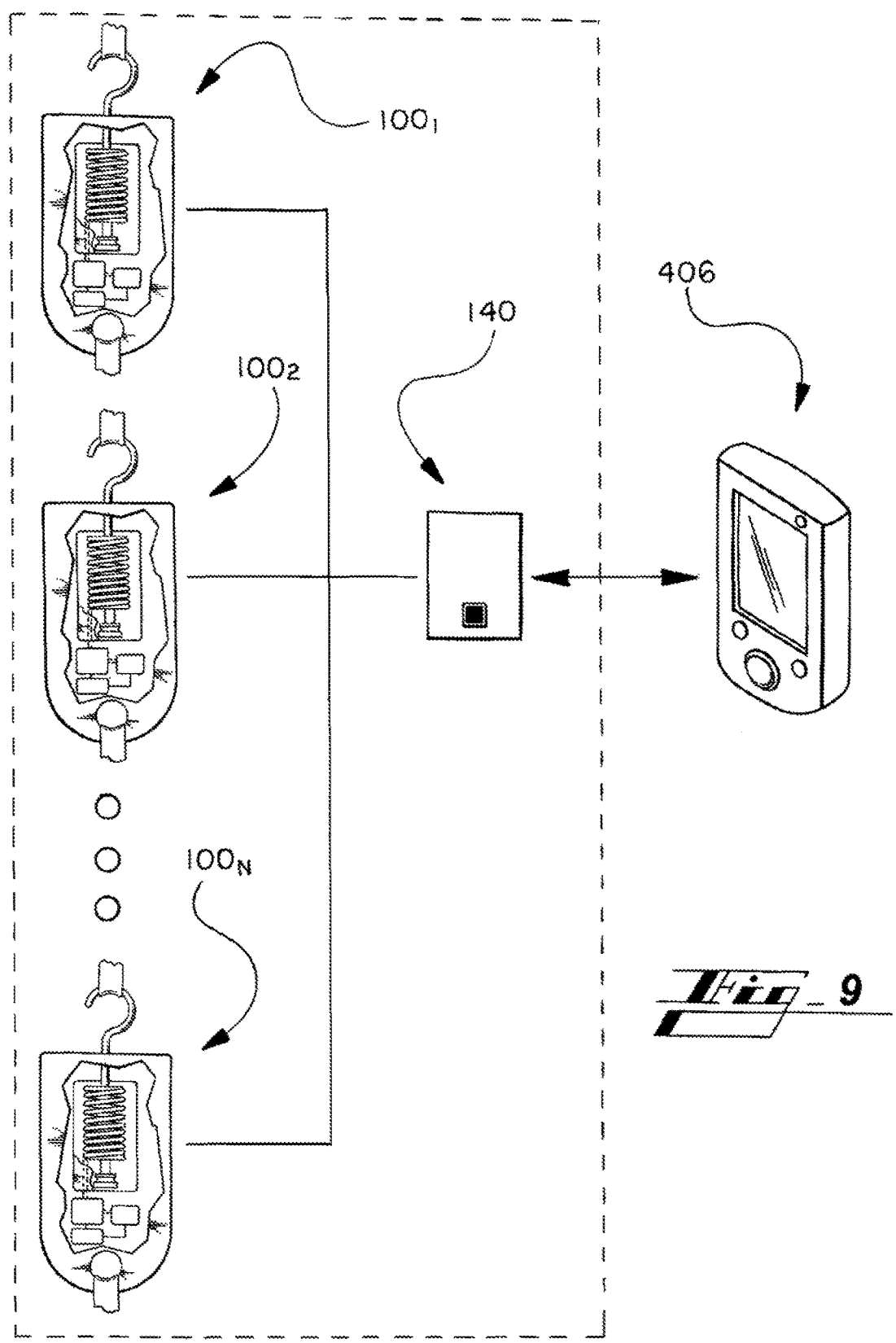
Fig_9

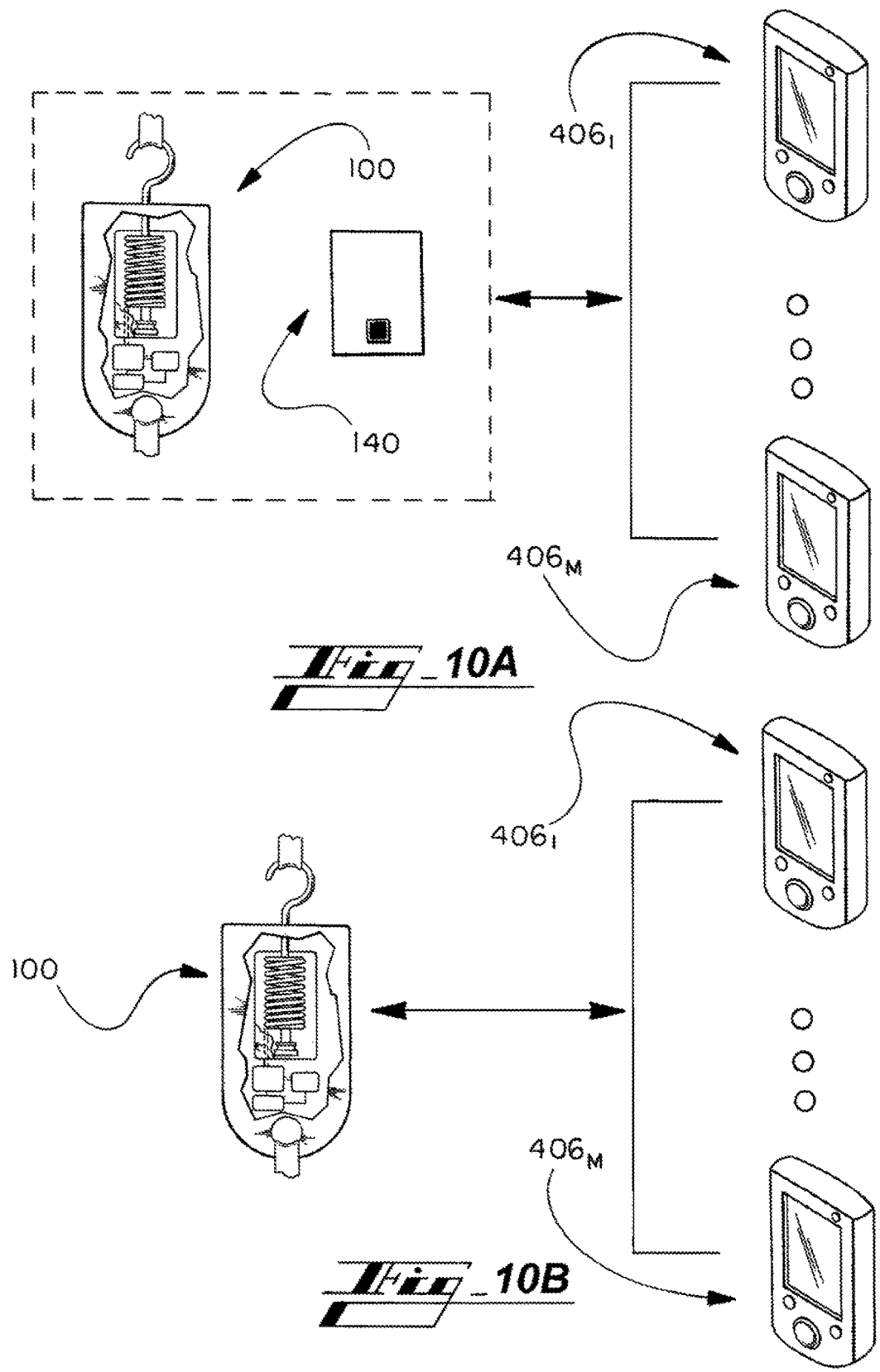

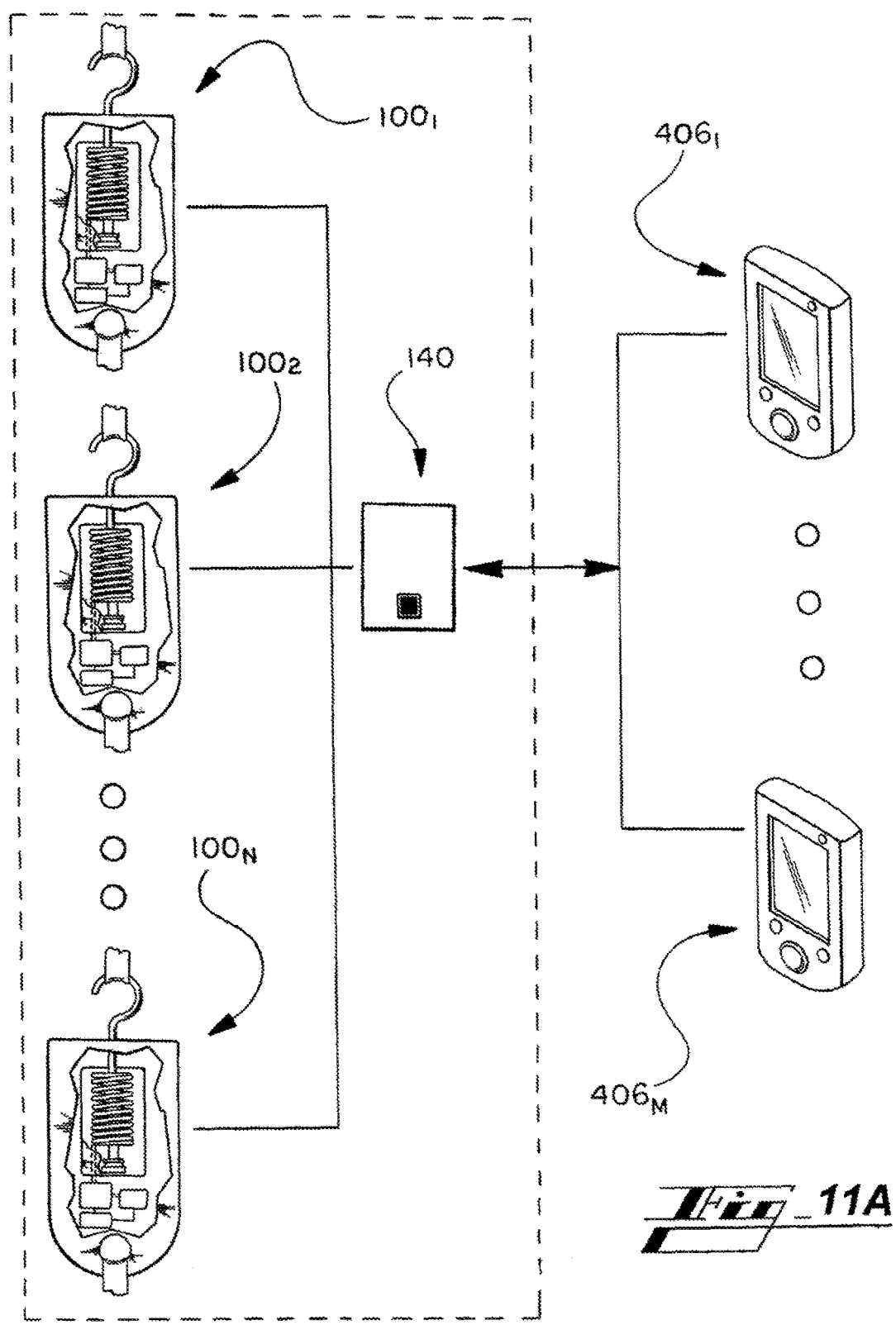
Fig_11A

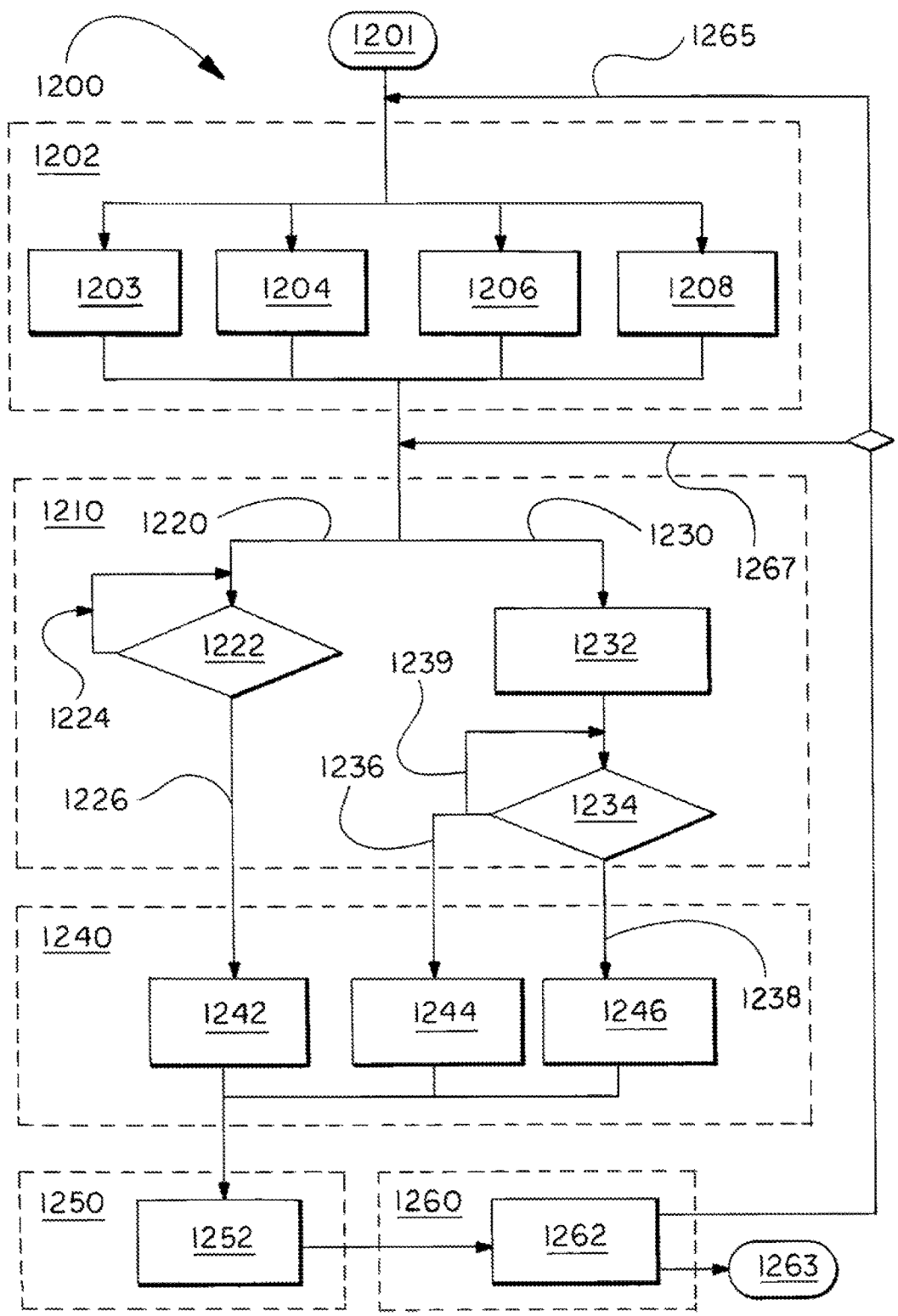
Fig_12

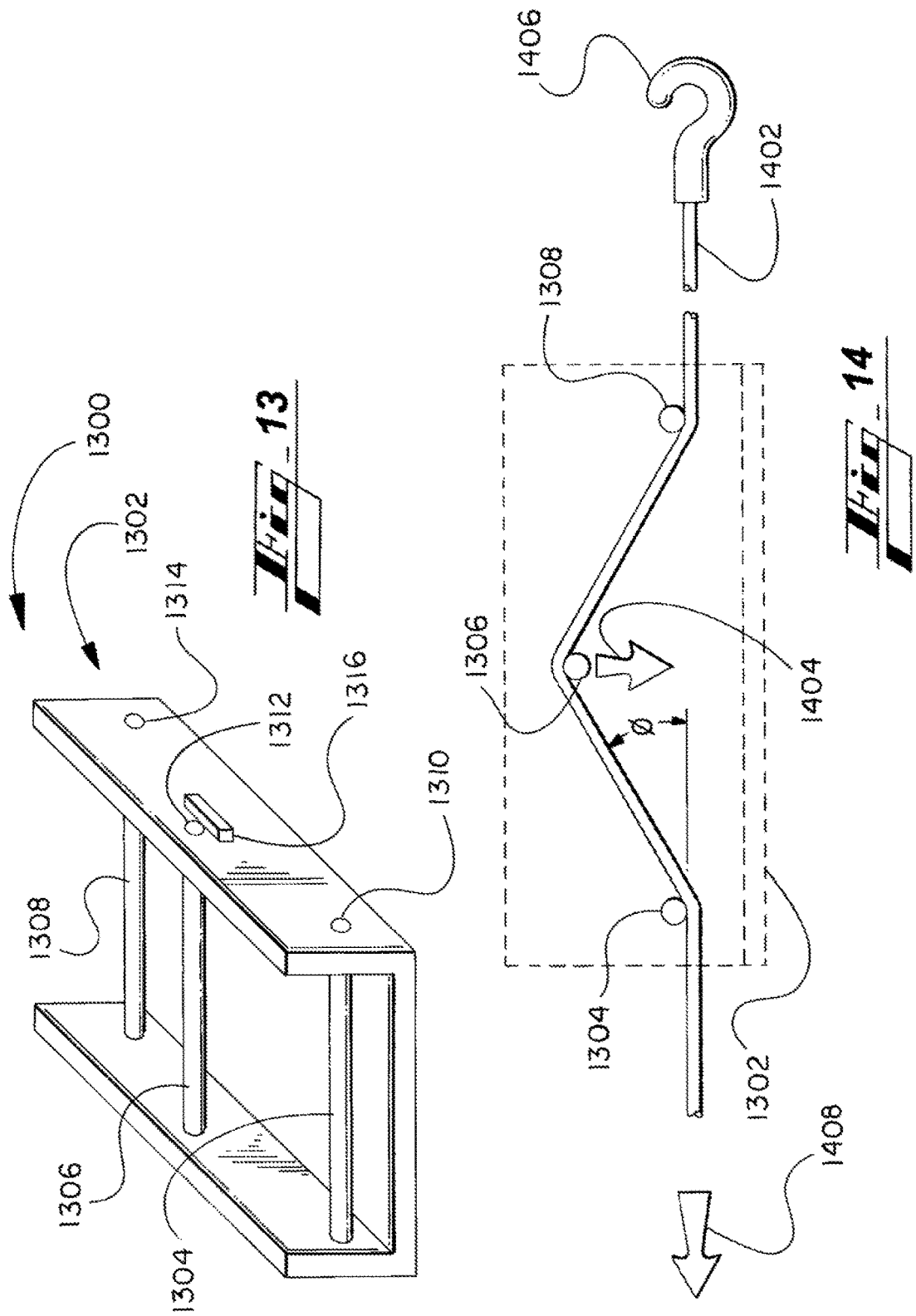

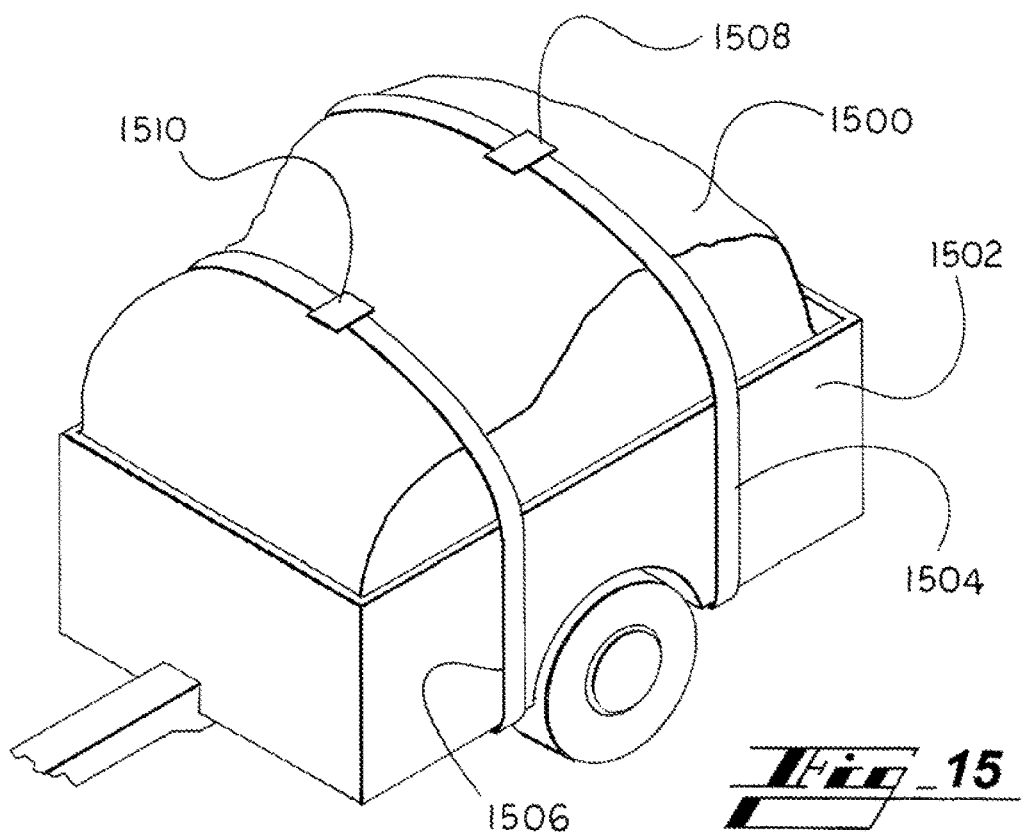
Fig_15
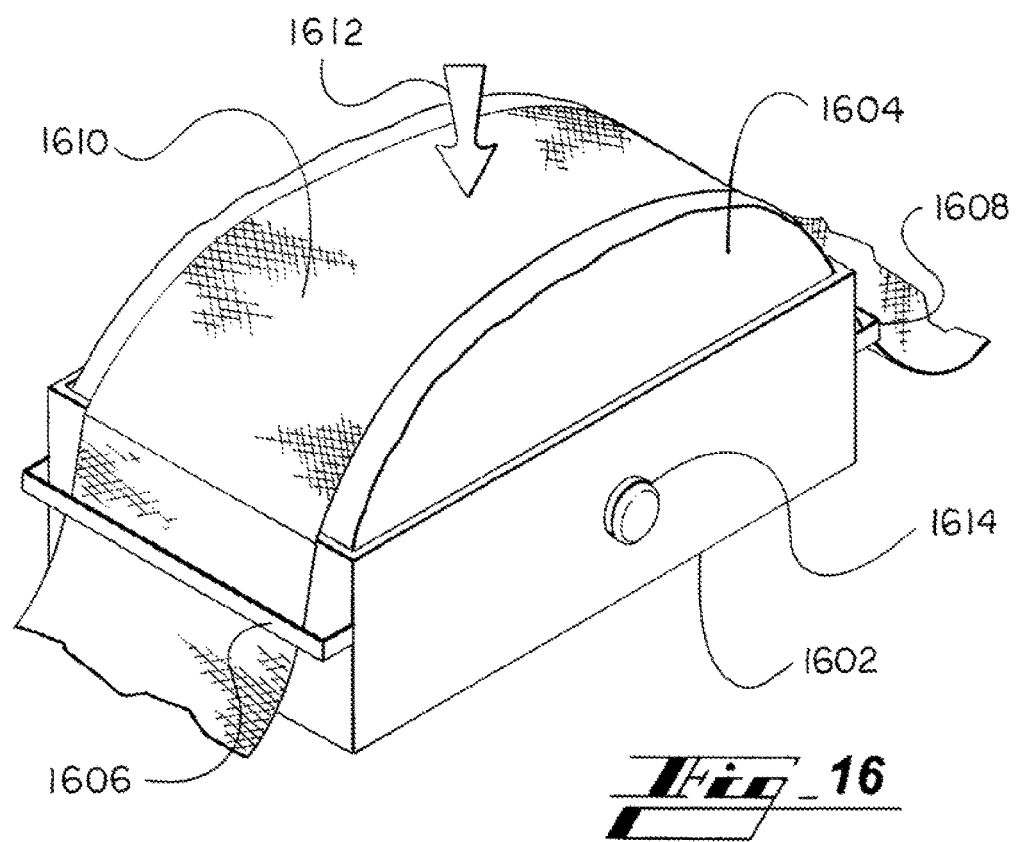
Fig_16

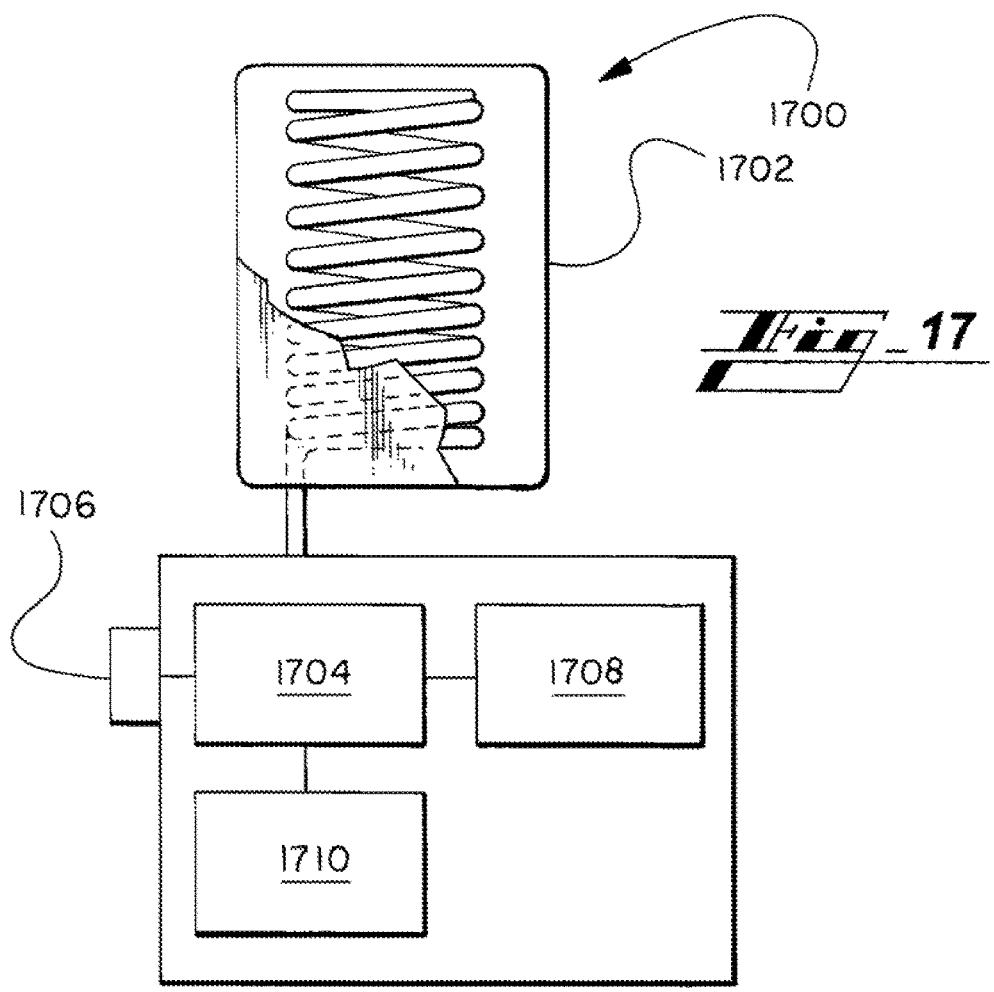
Fig_17
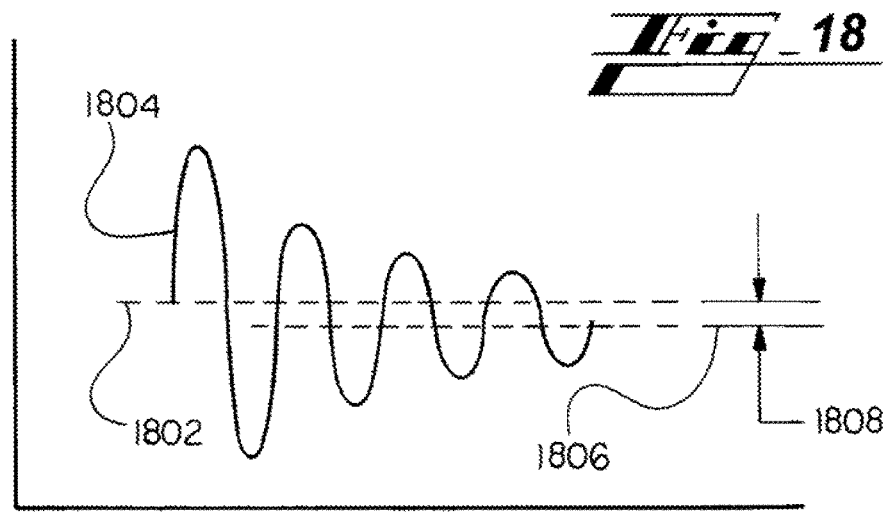
Fig_18

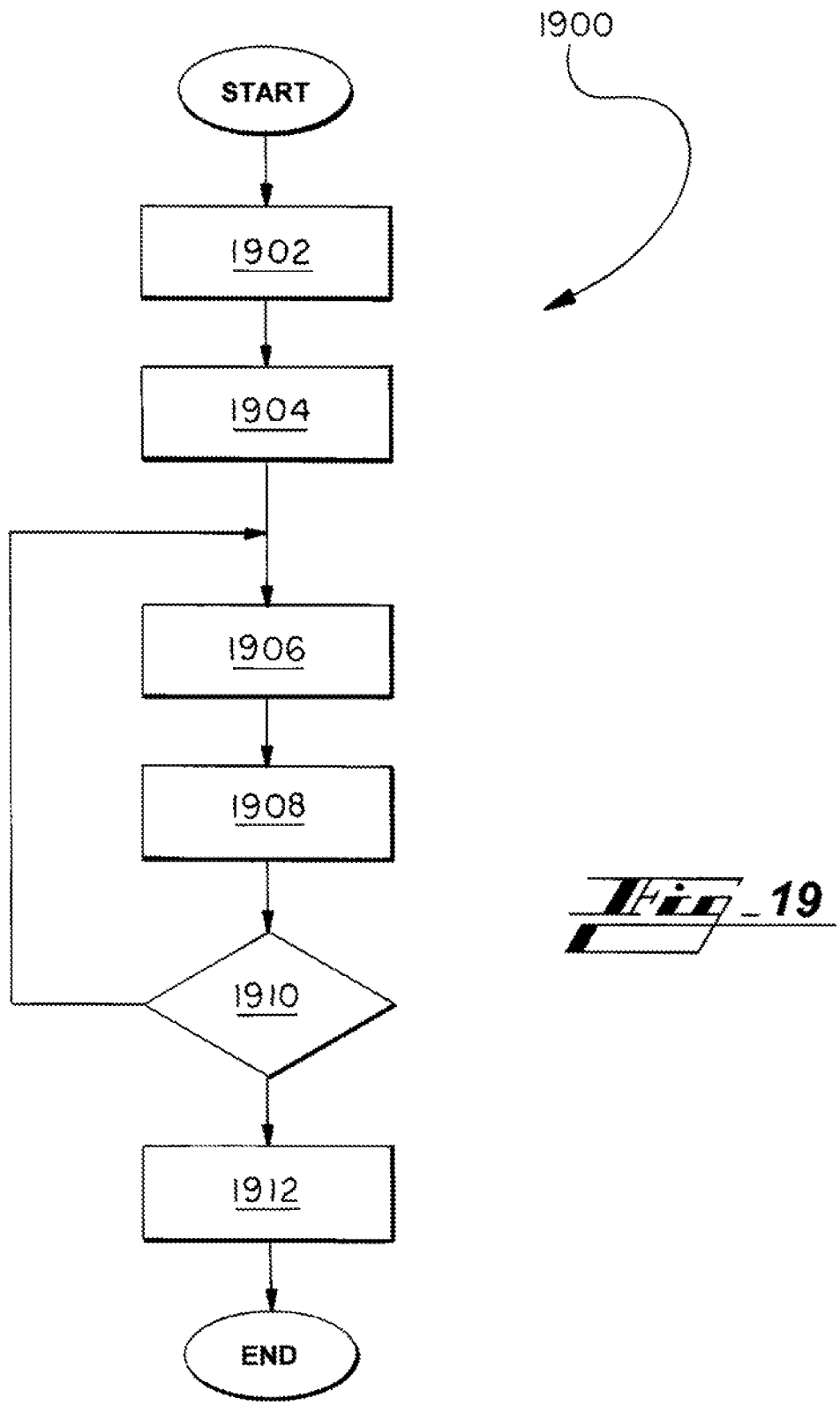

AUTOMATED WIRELESS SECUREMENT-MONITORING AND FEEDBACK SYSTEM

RELATED APPLICATION

This application claims priority to U.S. Provisional Patent Application No. 62/199,528, for Automated Wireless Securement-Monitoring And Feedback System, filed on Jul. 31, 2015, which is incorporated here in its entirety by this reference.

TECHNICAL FIELD

The present disclosure relates generally to systems for securing objects and more particularly to systems, for monitoring securements, comprising a sensor device in communication with one or more securing components and configured to communicate wirelessly with a custom remote reporting-device application.

BACKGROUND

Systems for securing objects sometimes become loose. While a small amount of adjustment is tolerable in some circumstances, the securing system can become too loose.

Individuals and companies use one type of securing system or another in their daily operations. From manufacturing, to product storage, to transport, holding objects securely in place is a common challenge. Regarding shipping, for instance, it has been reported that each year more than five-hundred large containers are displaced from cargo ships and into the sea in non-catastrophic episodes. Insecure commercial loads, whether at sea, on the highway, or on a shelf, can damage products or the environment, pose a safety or health risk, and be costly.

In non-commercial affairs, people commonly secure objects such car seats and small loads.

It is very difficult and in case impossible for a user to regularly determine whether a securing system is becoming too loose. Primary approaches of analysis include visual and manual inspection, such as simply viewing or pulling on a tie strap. These methods are not always reliable. A secure strap may appear sufficiently tight, for instance, when it is in fact not.

Many loads cannot be visually or manually inspected at all relevant times, such as by a driver of a vehicle carrying the load. For this reason, many securements are evaluated only when first secured, and occasionally at a later time, and still only visually or manually at those times.

SUMMARY

There is a need for systems and methods for ensuring whether an object securement remains sufficiently tight.

The present disclosure relates in various embodiments to a method, comprising receiving, by a destination device (e.g., computer, tablet, mobile phone, or computer monitoring system such as an on-board computing system at a vehicle) at which a securement-monitoring application is operating, from a securement sensor device (or, "smart linkage"), a securement-condition communication indicating a condition of a securement remote to the destination device. The method further includes determining, by the destination device using the securement-monitoring application, an action to take responsive to the securement-condition communication. The method can further include initiating the action determined. The action can include, for instance, providing a user alert and/or an instruction on how to proceed, such as for an operator to stop the operator's current action and re-establish the securement.

In various embodiments the disclosure relates to a method comprising receiving, from a securement sensor device (e.g., smart linkage), by a server system comprising securement-monitoring programming, a securement-condition communication indicating a condition of a securement remote to the server. The securement-monitoring programming corresponds to a securement-monitoring application operating at a destination device (e.g., phone). The method of these embodiments further include determining, by the server system, an action to take responsive to the securement-condition communication. The action comprises sending a notification to the destination device comprising the securement-monitoring application and the notification is indicative of the condition of the securement.

The technology of the present disclosure also relates in embodiments to a system comprising a processor and a computer-readable storage device comprising a securement-monitoring application. The securement-monitoring application comprises multiple modules of instructions that, when executed by the processor, cause the processor to perform numerous operations. A receiving module of the securement-monitoring application, in operation of the system causes the processor to receive, from a securement sensor device, a securement-condition communication indicating a condition of a securement remote to the system. An evaluating module of the securement-monitoring application, in operation of the system causes the processor to determine an action to take responsive to the securement-condition communication. And an action module of the securement-monitoring application, in operation of the system causes the processor to initiate the action determined.

Other aspects of the present invention will be in part apparent and in part pointed out hereinafter.

DESCRIPTION OF THE DRAWINGS

FIG. 6 shows schematically a computing device according to various embodiments of the present technology.

FIG. 9 shows schematically a fifth example arrangement of components of a wireless securement-monitoring system, comprising multiple electronic securement sensor devices in communication with a single receiving computing device by way of multiple transceivers, according to an embodiment of the present technology.

FIG. 10A shows schematically a sixth example arrangement of components of a wireless securement-monitoring system, comprising a single electronic securement sensor device in communication with multiple receiving computing devices by way of single transceiver, according to an embodiment of the present technology.

FIG. 10B shows an embodiment like FIG. 10A except with the transmitter being removed or integral to the securement sensor device.

FIG. 11A shows schematically a seventh example arrangement of components of an electronic securing system, comprising multiple electronic sensor devices in communication with multiple receiving computing devices by way of single transceiver, according to an embodiment of the present technology.

FIG. 12 illustrates methods of operating the present systems according to various embodiments.

FIG. 13 illustrates an alternative embodiment of the present technology.

FIG. 14 illustrates an exemplary use of the securement sensing device of FIG. 13.

FIG. 15 illustrates application of the securement sensing device of FIG. 13 on a cargo.

FIG. 16 is another embodiment of the present technology.

FIG. 17 is a schematic diagram of a sensor.

FIG. 18 illustrates a variation of a sensed tension.

FIG. 19 is a flowchart for a process for detecting variation in tension.

Figure 1:
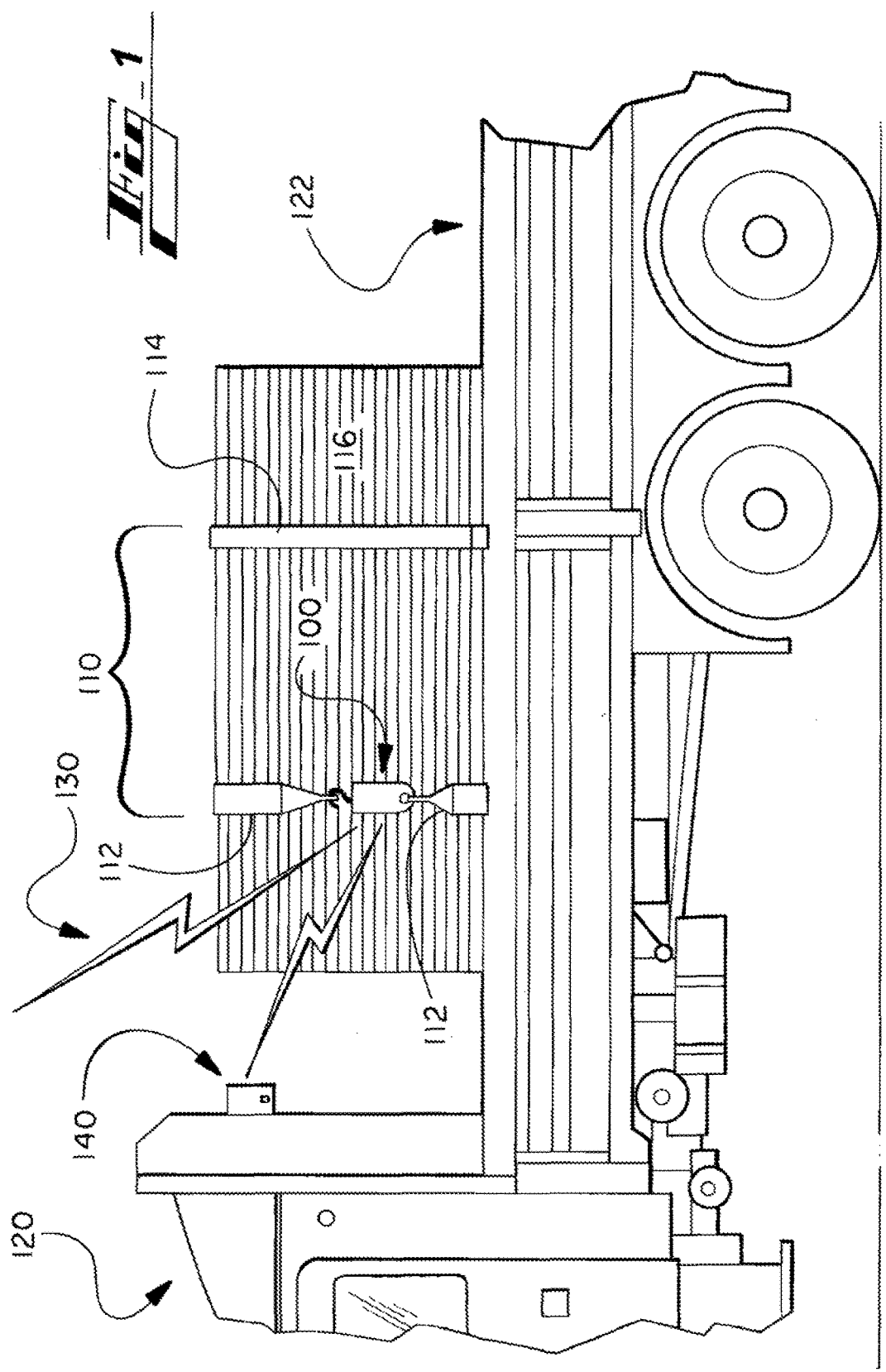
FIG. 1 illustrates components of a wireless securement sensor device installed in connection with truck cargo.

The figures are not necessarily to scale and some features may be exaggerated or minimized, such as to show details of particular components. In some instances, well-known components, systems, materials or methods have not been described in detail in order to avoid obscuring the present disclosure.

Specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model, or pattern.

Specific structural and functional details disclosed herein are not to be interpreted as limiting, but merely as a basis for the claims and as a representative basis for teaching one skilled in the art to employ the present disclosure.

I. Technology Overview

The present disclosure describes systems and methods for effective and efficient monitoring of securement systems. The system or parts thereof can be referred to as a securement-monitoring-and-notification system.

While the present technology is described largely herein in connection with securement of objects in storage or transport, such as truck or ship cargo, the technology is not limited to these applications. The concepts can be used in a wide variety of applications, such as in connection with train cargo, airplane cargo, agricultural or horticultural applications, chemical storage or handling applications, manufacturing applications, warehouse and inventory-movement and storage applications, industrial or construction industry uses, such as by crane operators, car seats, seatbelts, or most any situation in which a user wants to monitor status of one or more objects. The status can relate to, for instance, a variety of conditions such as whether the object(s) are secure, closed properly, moving properly, etc.

In one implementation, a securement-monitoring-and-notification system is used to monitor any connection that is designed to change over time. As an example, the securement-monitoring-and-notification system can be used by a gardener or horticulturalist in connection with a support (e.g., straps, ropes, or the like) connected to a young or injured tree. The securement-monitoring-and-notification system can notify the gardener when the tree has changed—e.g., straightened or grown—in a certain manner, whether desired or undesired, depending on how the system is set. Based on the notification, the user could determine, for instance, that the support is no longer needed and can be removed or that the support is ready to be inspected or modified.

The systems of the present technology comprise at least one electronic sensor device configured to connect to a securement, such as a strap of a cargo tie-down arrangement. Once engaged in position, the sensor senses (e.g., measures) a state of the securement, such as whether the securement has become too loose, or how tight the securement is. Timing of the sensing can be continuously or intermittent—e.g., at regular intervals or in response to a trigger such as request to measure, for instance.

The system further comprises a remote computing device comprising a custom securement-monitoring-and notification program for interpreting in real time signals or messages received directly or indirectly from the electronic sensor device.

The present technology has multiple advantages over traditional approaches. As mentioned, simple visual or manual inspections are not always reliable, and difficult or impossible to perform at all times. The present system allows a user to accurately monitor a securement without having to be present at the securement. Users can thus focus on other tasks more, such as driving. The system also keeps secured objects from falling or otherwise moving undesirably.

II. FIGS. 1-3

Turning now to the figures, and more particularly to the first figure, FIG. 1 illustrates components of an electronic sensor device installed in connection with truck cargo The securement sensor device 100 is referenced generally by numeral 100 in FIG. 1. The device 100 can have any of a wide variety of configurations, including those not shown. Generally, the device 100 is configured to sense a characteristic or state of a physical connection.

While the sensing described primarily herein comprises mechanical sensing, such as by way of a strain gauge, the device 100 is in other embodiments configured to, instead or in addition to the mechanical structures, sense state of a physical connection in other ways, such as by light, camera, or laser-based sensing, or other, to measure proximity, orientation, position, or other characteristics of the securement or object(s) secured.

The present disclosure describes primarily embodiments in which the securement sensor device 100 is configured and arranged with the securement 110 to measure a tension force of, within, or at parts of the securement—for example, a tension force between two adjacent strap parts of the securement, as shown in FIGS. 1-5. In other embodiments, other variables are measured.

As one example, the system is configured to measure distance, linear, angular, or otherwise. A rotational position or change can be measured in degrees, for instance, such as how far a spring-loaded retraction system (e.g., for a seatbelt) is forced to turn in use.

As another example, the system is configured to measure vibration. A notification can be generated in response to the vibration having a preset characteristic, such as a preset frequency and/or amplitude. This can be used when measuring a system such as a trailer hitch arrangement in which vibrations within a certain range are acceptable, but vibrations outside of the range would be indicative of a poor hitch connection.

As another example, the system is configured to measure orientation, position, or posture.

And while the device 100 is referred to primarily herein as a securement sensor device, it can be referred to by other terms, such as smart sensor device, smart linkage, smart link, intelligent linkage, securement-monitoring device, or the like. A combination of the sensor device 100 and the securement 110 can be referred to by the same terms or others such as smart or intelligent holding device, smart strap, smart tie strap, intelligent connector, intelligent or smart securement, or the like.

In FIG. 1, the securement sensor device 100 is shown installed with a securement 110 comprising one or more straps 112, 114. The securement 110 holds in place one or more objects 116.

While the embodiments shown described herein focus primarily on securements 110 that hold an item or object in place, they are not limited to these configurations or uses. The securement 110 in some cases actually does not secure a distinct object.

In an example embodiment (not shown), the securement sensor device 100 is configured to sense whether a first item or component is secured appropriately to a second component. The first item or component can include, for instance, a trailer hitch ball and the second component can include a trailer tongue or coupler that goes over the ball to make the connection. The sensor device 100 can be configured to connect to, or sense without connecting to, one or both components, such as by being able to wrap around part of all of the combination of components. In one embodiment, the sensor device 100 is configured to connect to ancillary hardware, such as a traditional or custom latch arm or latch spring in the trailer hitch example.

According to another embodiment, a door arrangement or parts thereof (e.g., latch hardware) may be considered the securement 110. The securement sensor device 100 could measure whether the door is closed/open, or how tight the door is closed. A door to a sealed compartment may appear fully closed to the naked eye or touch, for instance, but be open enough to allow fluid to pass in or out undesirably.

In various contemplated embodiments, the securement sensor device 100 is a part of the securement 110. The sensor device 100 can be a permanent part of the securement 110. The two can be manufactured together to form a single product or kit. They can be connected after manufacture. In various embodiments, the sensor device 100 is readily removable from the securement 110, such as for storage and use with other securements 110.

In the example of FIG. 1, the securement 110 is connected to a vehicle 120, particularly a truck having a bed 122 supporting the object 116. Other vehicle-related applications include roof racks, fleet delivery of vehicles, trailer-compartment loads, car seats, and seat belts, among others.

While the electronic sensor device can communicate with other distinct devices by wire, it is in various embodiments, configured to communicate wirelessly. Communications from the electronic sensor device are indicated generally by numeral 130.

The arrangement in some embodiments includes a wireless transmitter or transceiver 140 for receiving and transmitting wirelessly signals or messages received from the electronic securement sensor device 100.

Figure 2:
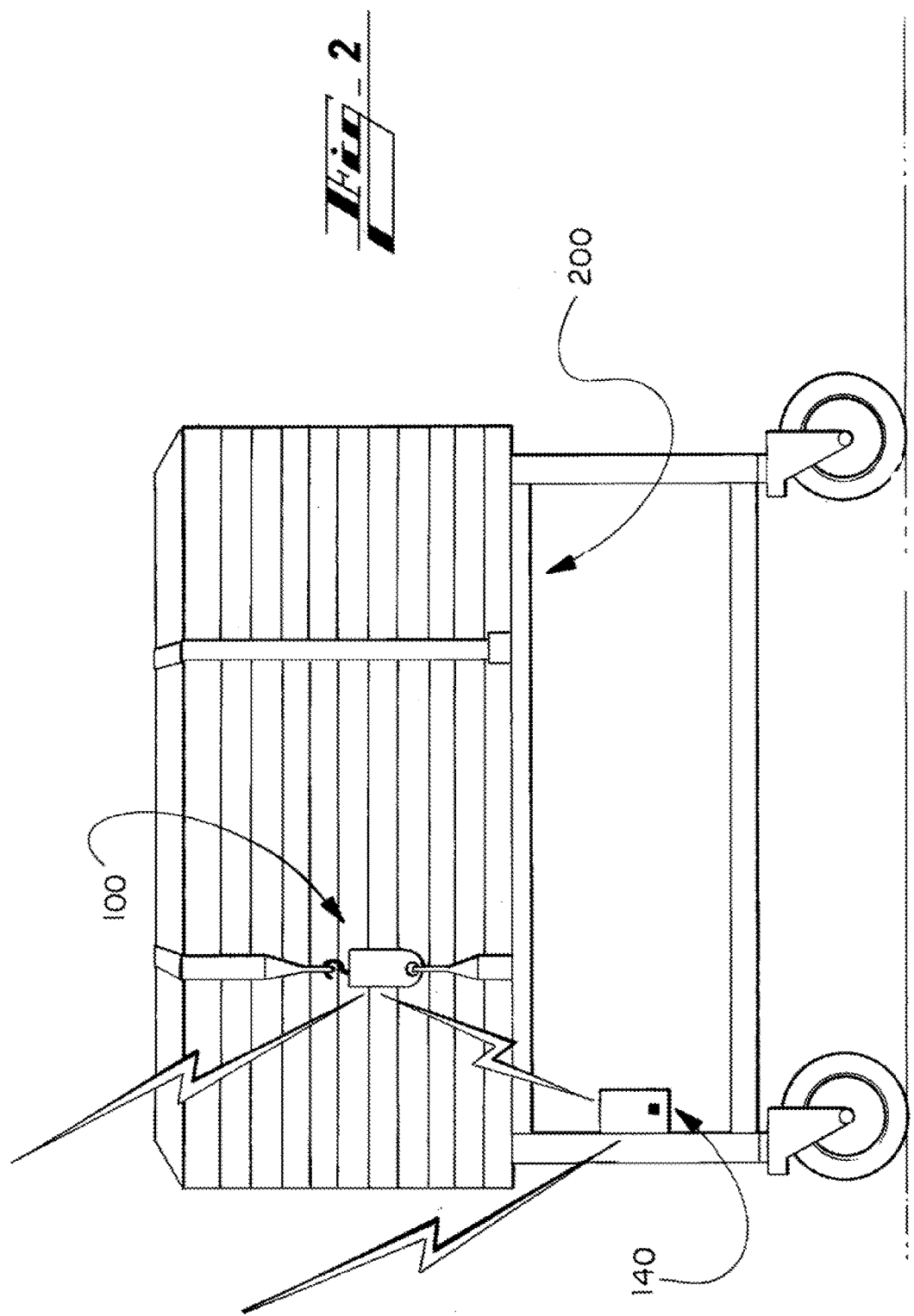
FIG. 2 illustrates the wireless securement sensor device installed in connection with a loaded cart.

FIG. 2 shows the securement sensor device 100, and wireless transceiver 140, installed in connection with a loaded cart 200.

Figure 3:
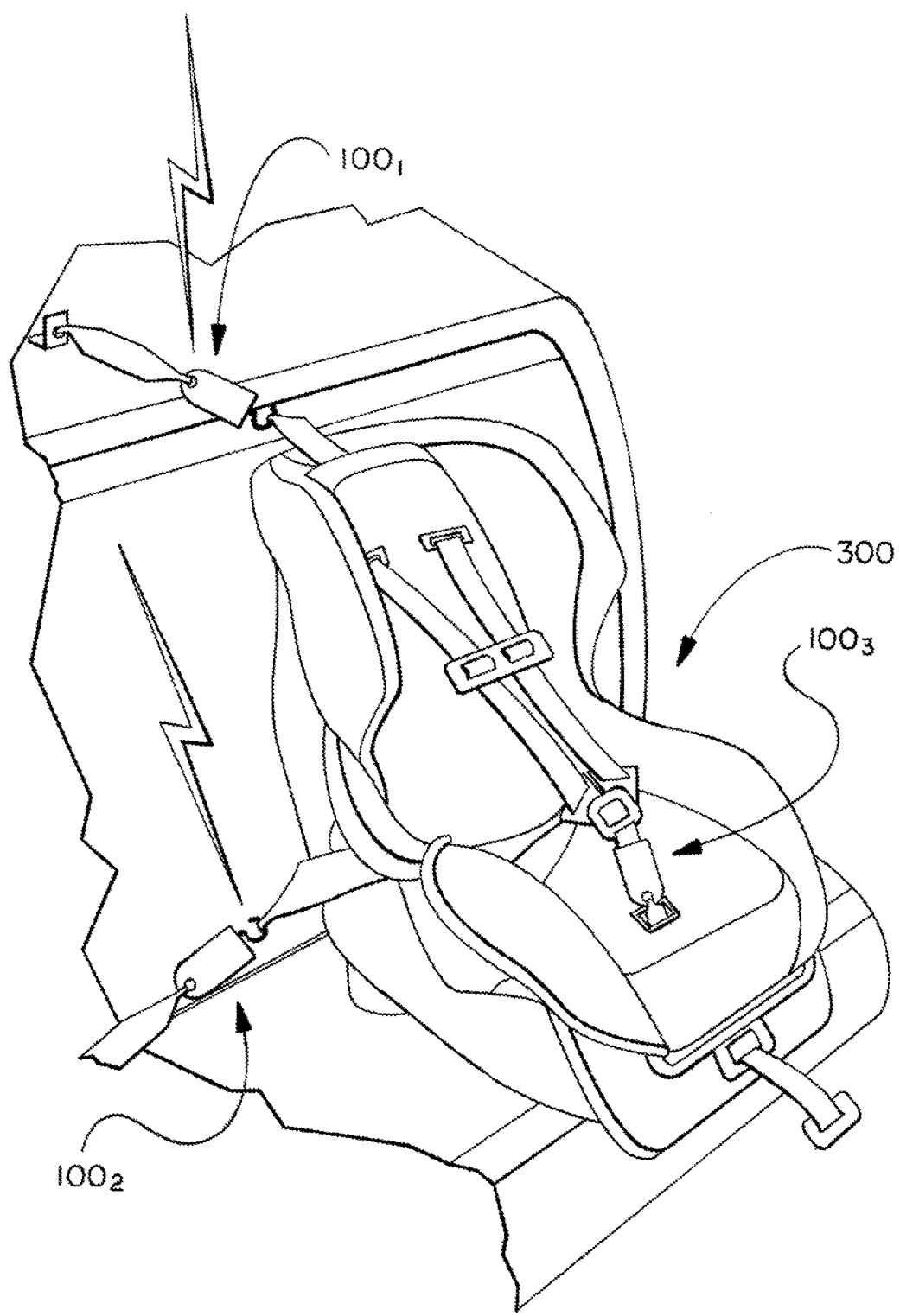
FIG. 3 illustrates the wireless securement sensor device installed in connection with a car seat.

FIG. 3 shows electronic securement sensor devices 100 installed in connection with a car seat 300. While the first two sensor devices $100_1$, $100_2$ are shown installed at both a rear tether area, above and behind the seat, and a lower anchorage area beside the car seat, one or more devices 100 can be used in these or other areas with respect to the car seat 300.

The device 100 can also be used in connection with the seat belt of the seat, for instance, as shown by the third sensor device $100_3$. The use can alert a parent when a child has removed their seatbelt. The device 100 can be used in connection with a seat belt whether part of a removable child seat or permanent to the vehicle.

The securement sensor device 100 can be configured to be connected to the seat belt in a non-visible position, such as by connecting to and measuring a spring-loaded retraction component of the seatbelt arrangement that is behind a B-pillar or C-pillar of the vehicle. In one embodiment, the device 100 is positioned within the seatbelt buckle to sense, for example, whether the belt is buckled.

Figure 4:
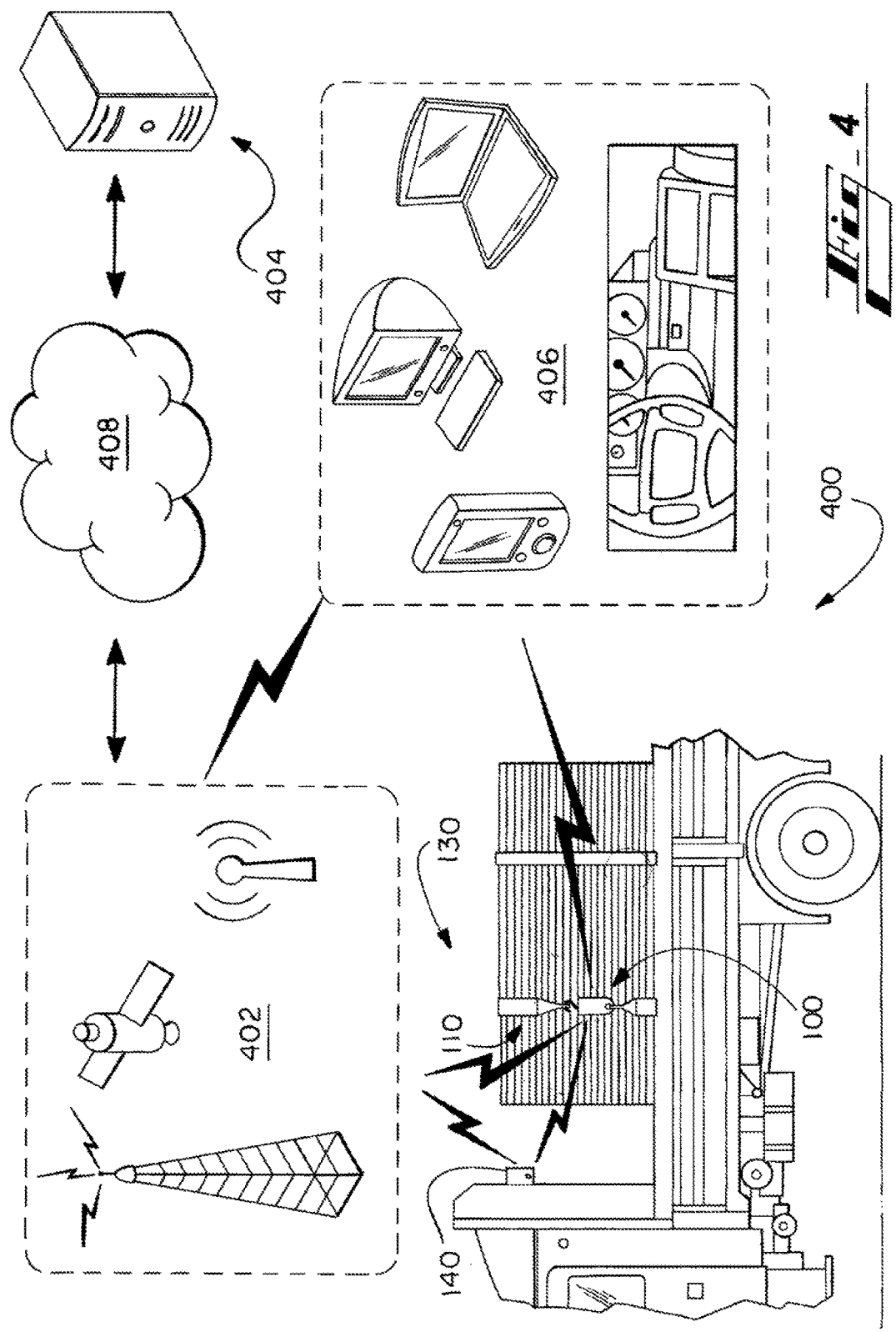
FIG. 4 illustrates a wireless securement-monitoring system comprising the sensor device according to an example implementation.

III. FIG. 4—Environment of Implementation

FIG. 4 illustrates an example system 400 by which the present technology is implemented. The system 400 includes the securement sensor device 100 installed with the securement 110 of FIG. 1.

The securement sensor device 100 communicates directly or indirectly with at least one receiving or destination device 406. Example destination devices 406 include mobile communication devices, such as tablets, smart phones, laptops. The destination device 406 could also include a desktop computer, and in one embodiment includes an in-vehicle computer/user interface, such as a vehicle telematics unit.

The destination device 406 in various embodiments comprises the custom securement-monitoring-and-notification application (app). In one embodiment, the destination device includes a visual, audible, and/or other (e.g., haptic) indicator to communicate to a user a status of the securement 110 based on a communication from the sensor device 100. The indicator can include a light (e.g., light emitting diode (LED)), for instance, a speaker, and/or an actuator to create a vibration. The sensor device 100 could also include any of these features to communicate status of the securement 110 to a user.

In one embodiment, the destination device 406 does not have or use for the present functions, complex computing structure. The destination device 406 can in this embodiment be referred to as a notification box or device. The notification box is configured, such as by appropriate circuitry, to receive a signal or communication, by wire and/or wirelessly, from the sensor device 100, and perform or initiate a user communication based on the signal or communication received. The user communication can include, for instance, illuminating a green light to indicate that the securement 110 is secured properly, and a red light to indicate otherwise. In a contemplated embodiment, multiple securements 110 are being monitored, and the notification box is configured to refer to the multiple securements 110. The box can include, for instance, a set of red and green lights for each securement 110, labeled to indicate which set corresponds to which securement 110. Of the box can include a display indicating for which securement 110 a present notification is being provided—a number "2" may be displayed while a green light is shown, then the number changed to "3" and the light changed to amber to indicate a somewhat loose state of the securement, advising a user that a second securement of the group being monitored is satisfactory while a third securement needs to be checked.

A signal or message with or without data can be sent from the securement sensor device 100 or received at the securement sensor device 100 directly to/from another device by way of a protocol such as, for instance, long-, medium-, or short-range communications—for instance, Bluetooth, near-field communications (NFC), dedicated short-range communications (DSRC), the like, or other.

The system 400 in some embodiments includes the mentioned wireless transceiver 140, as shown in FIG. 4. While wireless communications are described primarily herein, any connection described, such as between the securement sensor device 100 and the wireless transceiver 140, can be wired.

The wireless transceiver 140 can be configured to facilitate communications 130 between the securement sensor device 100 and one or more systems 402, 404, 406, which can be remote. The arrangement 400 in various embodiments includes or is in communication with one or more communication networks 408, such as a wireless beacon or hotspot system, a local-area network, (LAN), a wide-area network (WAN), the Internet, a cellular telephone network, or the like.

In one embodiment, the device 100 transmits data in a power-conserving manner, such as by only sending notifications intermittently instead of continuously, or at less-frequent intervals.

As used herein, the term remote refers generally to systems or devices that are separate, or spaced, from a focus system or device. A remote device in this instance can be positioned miles from the focus system, or meters away in the same room as the focus system.

The securement sensor device 100 is in some embodiments configured to communicate wirelessly with remote systems 402, 404, 406 without aid of an intermediary transceiver 140. In some embodiments, for instance, the securement sensor device 100 contains a wireless transmitter or transceiver, such as a short-, medium-, or long-range transmitter.

A first intermediary remote system 402 includes at least one communication device for transferring signals or messages received directly or indirectly from the securement sensor device 100 toward the one or more destination systems 406. The first remote intermediary system 402 can include, for instance, a cellular communications tower, a communications satellite, or a wireless beacon. The first intermediary remote system 402 could also include a mobile device capable of receiving and transmitting signals received from the sensor device 100, such as a mobile phone operating as a hotspot.

In a contemplated embodiment, the second intermediary remote system 404 includes a server. The server 404 is programmed with custom securement-monitoring-and-notification computer-executable instructions or code to serve the correspondingly customized program or app operating at the destination system 406. The code can be arranged in modules and referred to by terms such as securement-monitoring program. The custom program of the server 404 corresponds to the custom application operating at the destination device 406.

The server 404 is in some embodiments configured to receive signals or messages from a plurality of distinct securement sensor devices 100, prepare one or more corresponding messages, and send the message(s) to one or more destination devices 406. This embodiment can be useful to managers monitoring a plurality of securements, such as an operator of a fleet of delivery trucks.

In a further contemplated embodiment, the server 404 is configured to perform functions such as storing data received from the securement sensor devices 100, in a local or remote database, or analyzing the data such as to recognize historic trends or highlight past securement issues. The server 404 could, for instance, generate a report indicating when a particular securement sensor device 100, of multiple securement sensor devices 100 being monitored, indicates that a securement 110 has failed or is too loose. Or the server 404 could be configured to generate a report indicating a value or quality of the securement 110 as measured by a particular securement sensor device 100 of the multiple securement sensor devices 100 being monitored. In a contemplated embodiment, the destination device 406 is configured to perform any of these functions.

Figure 5:
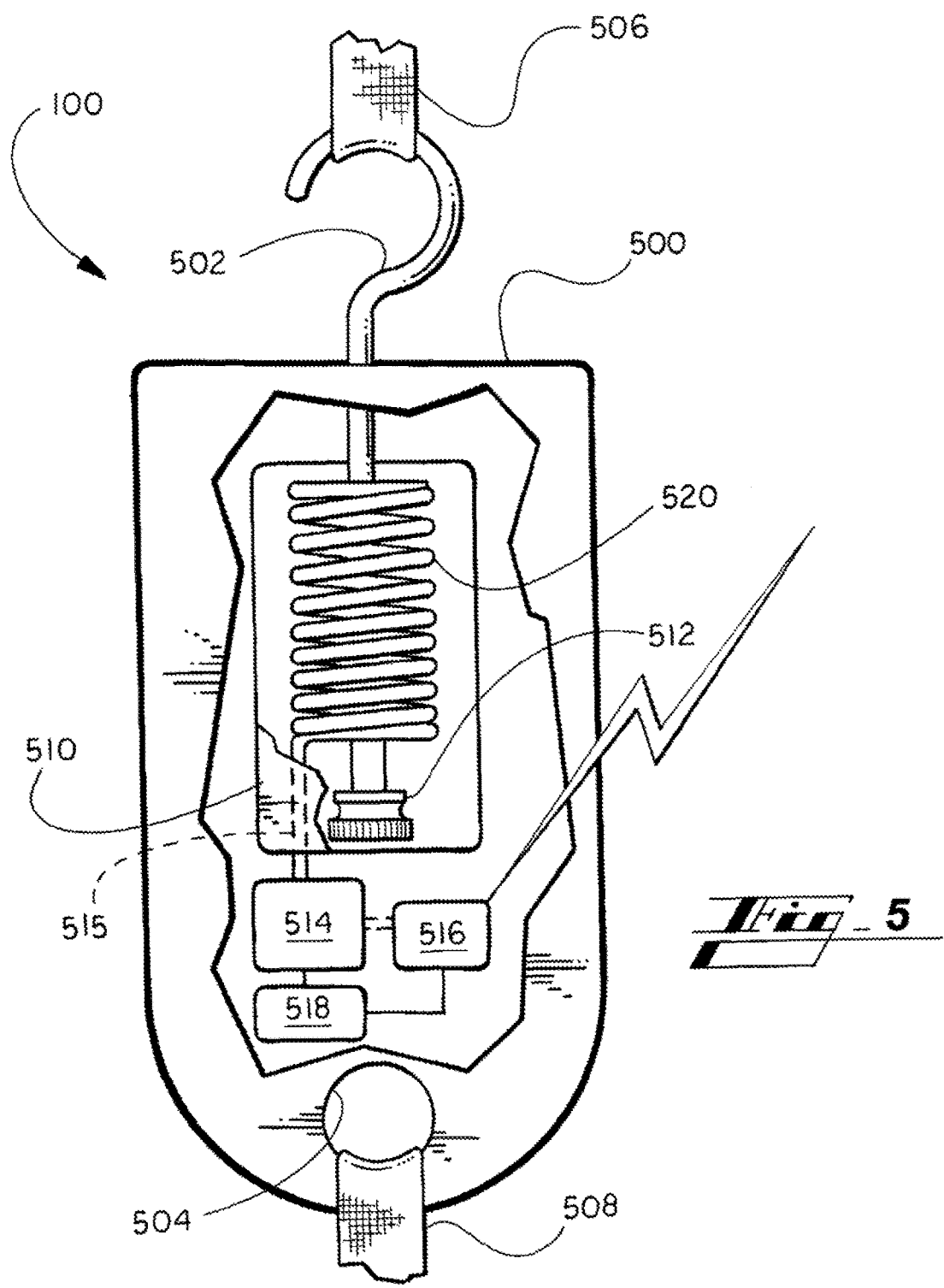
FIG. 5 shows schematically features of the wireless sensor device of FIGS. 1-4 according to an example embodiment of the present technology.

IV. FIG. 5—Wireless Sensor Device Features

FIG. 5 shows example components of the securement sensor device 100. The device 100 includes a body 500. The body 500 includes or is connected to a first connecting component 502 and a second connecting component 504.

The connecting components 502, 504 are configured to connect to respective portions 506, 508 of a securement system, such as straps 112, 114 of the securement 110 of FIG. 1. In some implementations, one of the securement portions 506, 508 is a buckle, loop, hook, screws, bolts, hooks, hook-and-loop, or anchor, such as an anchoring buckle or loop of the truck bed 122 of FIG. 1.

In various embodiments the connecting components 502, 504 can include or be connected to any type of connecting structure, such as latches, pins, screws, bolts, hooks, hook-and-loop fasteners, or other fasteners or fastening means.

In the example of FIG. 5, a first connecting component 502 includes a hook for connecting to a strap or other first portion 506 of the subject securement. The second connecting component 504 is shown by way of example as an eyelet or hole for receiving or connecting to a second strap or other portion 508 of the subject securement.

The securement sensor device 100 further includes a sensing component 510. In various embodiments, the sensor device 100 comprises any of an adjustment mechanism 512, a controller 514, an output 516 (or input/output), such as a transmitter or transceiver, and a power source 518 (e.g., battery) in communication with them. The device 100 can further include an on-off switch (not shown in detail). The output 516 may be equipped with wireless communication capability that enables the securement sensor device 100 to receive a threshold value for the securement tension from the destination device 406 or another remote device and to send an output message regarding the state of the securement to the destination device 406.

In various embodiments (not shown), the device 100 is hardwired for communication and/or power. In the example of FIGS. 1 and 2, for instance, the securement sensor device 100 can be connected to an anchor on the truck bed 122, and wired to the vehicle 120. The sensing device 100 can be connected to the vehicle 120 mechanically, or mechanically along with either or both of electrically and by wired communication line. The device 100 can be connected to the vehicle 120 permanently, or removable, allowing for removing after each use as desired.

As described more below in connection with the method 1200 of FIG. 12, the securement sensor device 100 in various embodiments also includes local-communication components (not shown in detail), such as one or more lights (e.g., green light, red light) and a speaker for providing an audible sound. The securement sensor device 100 can be configured to use these components to provide any of a variety of notifications, such as to indicate whether a securement 110 to which the securement sensor device 100 is secured sufficiently, such as during an initial setup or calibration stage of the method 1200.

The adjustment mechanism 512 can be mechanical, electrical, electronic, and/or digital. In the example of FIG. 5, the adjustment mechanism 512 comprises an adjusting screw. A user or calibrating machine turns the screw before use of the device 500 to achieve an appropriate preset condition, e.g., pretension, at the sensing component 510.

The sensing component 510 is in communication directly or indirectly with at least one of the connecting components 502, 504. In the example of FIG. 5, the sensing component 510 is connected to, or in mechanical communication with, the second connecting component 502.

Generally, the sensing component 510 provides an output signal or message indicating a condition between connecting components 502, 504, or at one or more connecting components.

The sensing component 510 can include any of a wide variety of transducers or other sensors configured to convert a variation in a physical characteristic. Example characteristics include tension force within the securement 110, position of the securement, and position, orientation, movement (e.g., vibrations) of an item being secured. The characteristic is converted to a corresponding electrical signal indicating a quantity and/or quality of the physical characteristic sensed.

The sensing component 510 is in various embodiments configured to sense compression, bending, tension, and/or torsion.

The sensing component 510 in various embodiments is configured to sense whether a requisite force condition (e.g., tension) exists between the connecting components 502, 504.

The sensing component 510 is in various embodiments configured to translate a mechanical condition into a corresponding signal. Example mechanical conditions include the connecting components 502, 504 being connected or not, or an amount of tension by which one or both of the connecting components 502, 504 are pulling on the sensing component 510.

In various embodiments, the sensing component 510 is configured to provide variable feedback and/or courser, e.g., binary feedback—such as on/off—or closed/open-state feedback.

In the embodiment of FIG. 5, the sensing component 510 comprises a spring arrangement 520 such as a spring-loaded linear potentiometer. The spring arrangement 520 can include a spring positioned around a central part, such as a central post (not shown in detail). The central part can be connected directly or indirectly with the first and/or second connecting components 502, 504. The spring arrangement or potentiometer can have any of a wide variety of characteristics, such any possible stroke length and resolution.

For embodiments in which the securement sensor device 500 comprises an adjustment mechanism 512 and the sensing component 510 comprises a spring arrangement 520, a user or calibrating machine can turn the screw before or during use of the device 500 to achieve the appropriate preset condition, e.g., pretension, in the spring arrangement 520. This step can be referred to as a calibration, setting, or setup step.

In various embodiments, the sensing component 510 includes an electric or magnetic switch. In a particular implementation, the component 510 is configured to provide an output signal when a tension, or force pulling at the sensor device 100 from one or more directions, falls below a preset threshold. This can occur when the securement 110 to which the sensor device 100 is connected becomes loose.

In various embodiments, the sensing component 510 comprises or is connected to a switch, such as a microswitch, or strain gauge. A switch can be configured, for instance, to provide courser, e.g., binary feedback, such as on/off, sufficient tension/insufficient tension, open/closed feedback.

A variable sensor, such as a linear spring potentiometer, can be connected to a binary switch and trigger switching of the switch when slack in the securement 110 exceeds a pre-set threshold level.

The controller 514 receives output signals from the sensing component 510, such as by the communication link 515 shown by dashed line in FIG. 5. The controller 514 can be of any type sufficient to perform or facilitate functions of the securement sensor device 500 described herein.

In a contemplated embodiment, the controller 514 is configured to perform computing operations. The controller 514 can include a processor, and can include or be in communication with computer-implemented code for performing or facilitating functions of the securement sensor device 500. The controller 514 can in this case include components like those described below in connection with the computer device 600 of FIG. 6.

In one embodiment the controller 514 is configured to perform one or more conversions or transformation, such as from analog to digital (A/D).

In one embodiment, the controller 514 is configured to translate or convert feedback—e.g., output signal—from the sensing component 510 to an output message indicating the condition (e.g., insufficient tension) triggering the feedback. In some embodiments, a signal from the sensing device 100, even without being translated or converted, indicates to one or more remote device 402, 404, 406 existence, quality, or quantity of a sensed condition.

V. FIG. 6—Remote Computing Device

FIG. 6 shows schematically a computing device or system 600 according to various embodiments of the present technology.

The computer system 600 is in some embodiments a part of a greater system 601, such as a securement system 100 or a vehicle 120.

The computer system 600 can include structure for implementing any of the computing devices described herein, such as the controller 514 of FIG. 5, a computing component of the server 404 of FIG. 4, or a computing component of the destination device 406 (e.g., tablet, phone or other mobile communications device) of FIG. 4.

The computer system 600 is described below primarily from the perspectives of the destination device 406 and the server 404 by way of example.

Although connections are not shown between all of the components illustrated in FIG. 6, the components can interact with each other to carry out functions of the system 600.

As shown, the computer system 600 includes a memory, or computer-readable media 602, such as a volatile medium, non-volatile medium, removable medium, and non-removable medium. The term computer-readable media and variants thereof, as used in the specification and claims, refer to tangible or non-transitory, computer-readable storage devices.

In some embodiments, storage device includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The computer system 600 also includes a computer processor 604 connected or connectable to the computer-readable medium 602 by way of a communication link 606, such as a computer bus.

The processor 604 could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. References herein to processor executing code or instructions to perform operations, acts, tasks, functions, steps, or the like, could include the processor performing the operations directly and/or facilitating, directing, or cooperating with another device or component to perform the operations.

The computer-readable storage device 602 includes computer-executable instructions, or code 608. The computer-executable instructions 608 are executable by the processor 604 to cause the processor, and thus the computer system 600 (and still further the greater system 601 in embodiments) to perform any combination of the functions described in the present disclosure.

The instructions 608 are divided into any number (N) of modules $608_1$, $608_2$ . . . $608_N$, each configured to perform respective functions of the present technology.

A first module $608_1$ includes, for instance, an operating system (OS).

Modules can be formed and referred to according to their functions. For an operation of evaluating a measured securement condition, such as a force measurement to determine whether the condition is outside of preferred limits, the remote server 404 and/or the destination device 406 can include a module—e.g., the second module $608_2$—comprising code causing a processor of the server or device to perform the corresponding functions. The module in this case can be referred to as a securement-condition evaluation module, a securement-sensor output review module, the like or similar. The same format can be applied to each function, operation, or act described herein.

Module(s) 608 contributing to performance of the securement-monitoring-and-notification functions in embodiments form a securement-monitoring-and-notification program or application (app). The server 404 and destination device 406 include a securement-monitoring-and-notification programming and app, respectively.

As an example module 608, a second, or securement-monitoring, module $608_2$ comprises at least one application configured particularly to perform functions of the present technology relating to monitoring whether a securement 110 is fully connected—e.g., sufficiently tight—and/or monitoring a level of tightness of the securement 110. The processor 604, executing the securement—monitoring module $608_2$, determines whether the securement 110 is fully secure based on output received from the securement sensor device 100, such as an on/off, or open/closed sensing component 510 thereof, for instance. The processor 604, executing the securement-monitoring module $608_2$, determines whether the securement 110 is fully secure based on output received from a variable-feedback securement sensor device 100, such as the spring-loaded linear potentiometer described, for instance.

The computer system 600 further comprises an input/output (I/O) device 610 such as a wireless transceiver and/or a wired communication port. The processor 604 executing the instructions 608 sends and receives information, such as in the form of messages or packetized data, to and from one or more communication networks 408, such as the Internet. The system 600 can also send and receive data directly to/from another device, such as to/from the securement sensor device 100 by way of a protocol such as, for instance, a short-range communication like as Bluetooth, near-field communications (NRC), medium- or long-range communications, the like, or other.

In some embodiments, such as when the system 600 is implemented as a communication device 406, the system 600 includes or is connected to one or more local or connected input and/or output devices 610. Input devices 610 can include, for instance, a keyboard or touch-sensitive screen by which a user can provide instructions or requests, receive information such as reports, notifications, or alerts, and establish or modify preferences or settings.

A display screen that is part of or connected to a device (e.g., sensing device 100 or destination device 406) can display, in response to processor 604 output, an indication of whether the securement 110 is secured or an amount by which the securement 110 is secured. As an example, the display can include a green-colored representation displayed when the securement 110 is in proper status, and a red-colored representation when the securement 110 is in an undesirable condition, such as by being too-loose.

For embodiments in which variable feedback is received from the securement sensor device 100, the display can provide an indication of the level of security of the securement 110, such as an amount of tension force—measured in force units, percentage (such as 99% of maximum tension, whereby 95% or below is not acceptable), or level (such as a level of 1 to 10 where 10 is fully secured and 1 is fully loose), for instance.

Audible and/or haptic feedback can be provided by way of the ancillary devices 610 addition to or instead of display communications. The audible feedback can include a ring, siren, or other sound. Haptic feedback can include a vibration, for instance.

VI. FIGS. 7-11—Sensor/Controller/App Combinations

As mentioned above, in connection with FIG. 4, the arrangement 400 can include one or more securement sensor devices 100 in communication with one or more destination devices 406, and the arrangement 400 can include, if not a part of the sensor devices 100, one or more transmitters 140 for transferring signals or messages from the securement sensor devices 100 directly or indirectly to the destination device(s) 406. Various combinations can use one or more channels of communication, accordingly.

Figure 7A:
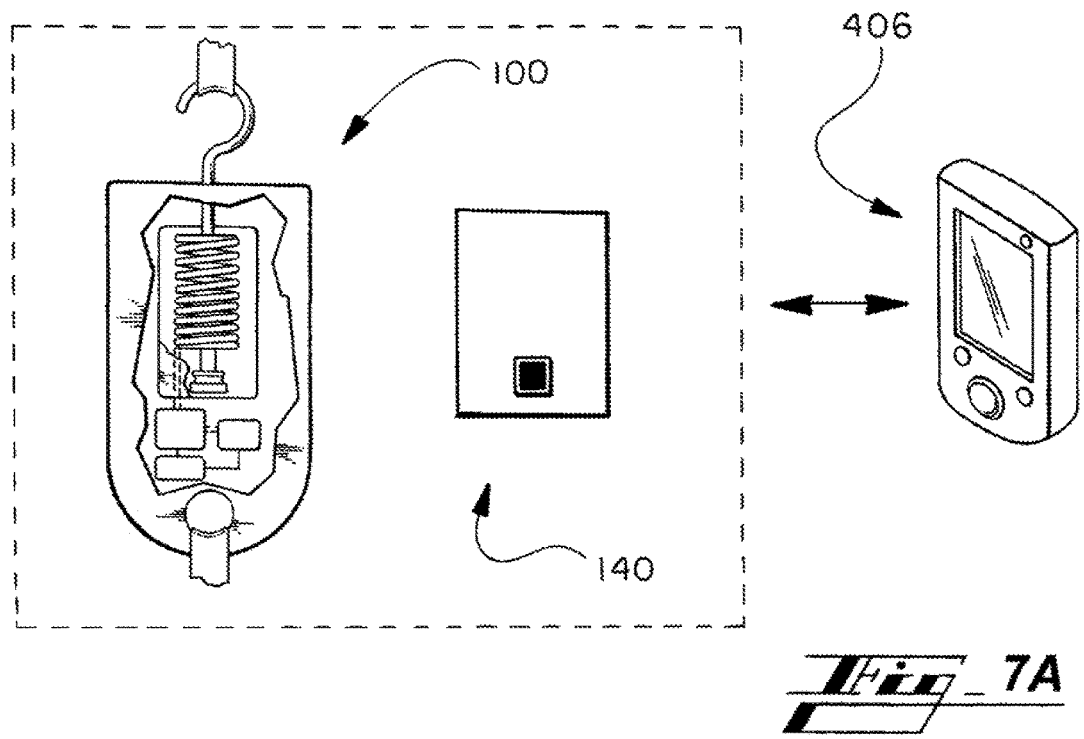
FIG. 7A shows schematically a first example arrangement of components of a wireless securement-monitoring system, comprising a single securement sensor device, a single transceiver, and a single receiving computing device, according to embodiments of the present technology.
Figure 7B:
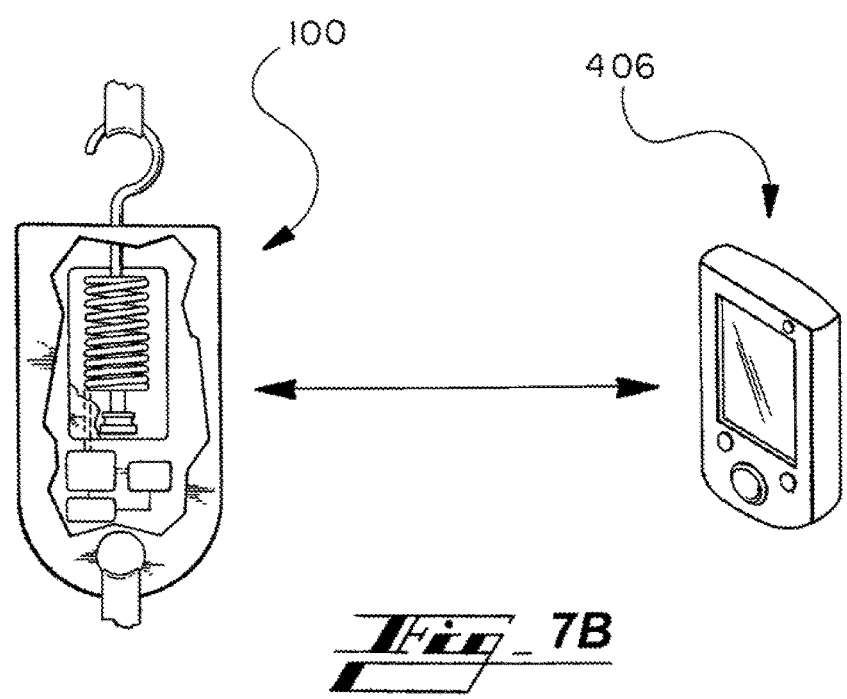
FIG. 7B shows an embodiment like FIG. 7A except with the transmitter being removed or integral to the securement sensor device.

FIG. 7A shows schematically a first arrangement of components of a wireless electronic securement-monitoring system, comprising a single securement sensor device 100, a single electronic transceiver, and a single receiving computing device, according to embodiments of the present technology. FIG. 7B shows an embodiment like FIG. 7A except with the transmitter being removed or integral to the securement sensor device.

Figure 8A:
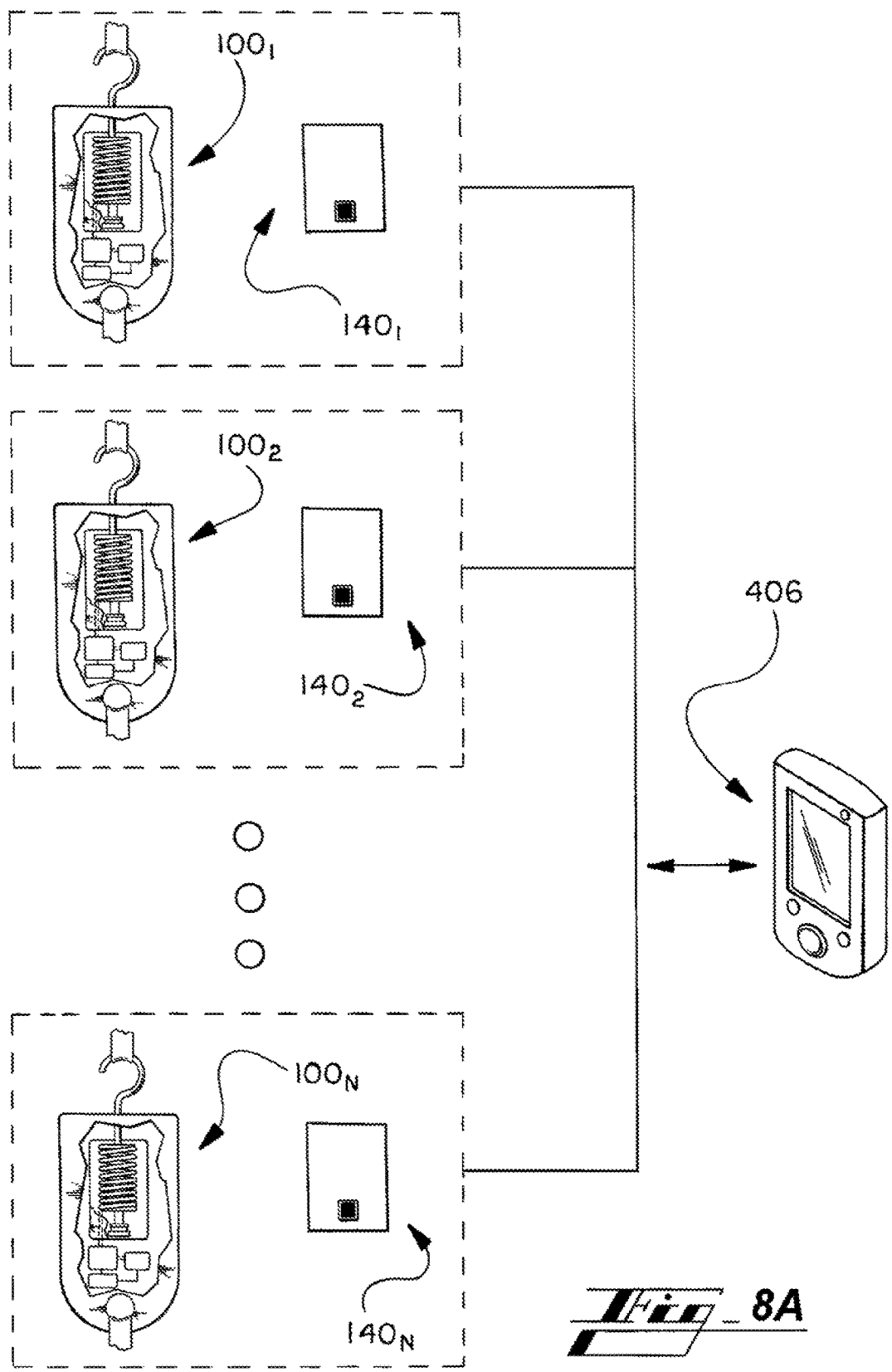
FIG. 8A shows schematically a third example arrangement of components of a wireless securement-monitoring system, comprising multiple electronic securement sensor devices in communication with a single receiving computing device by way of multiple corresponding transceivers, according to an embodiment of the present technology.
Figure 8B:
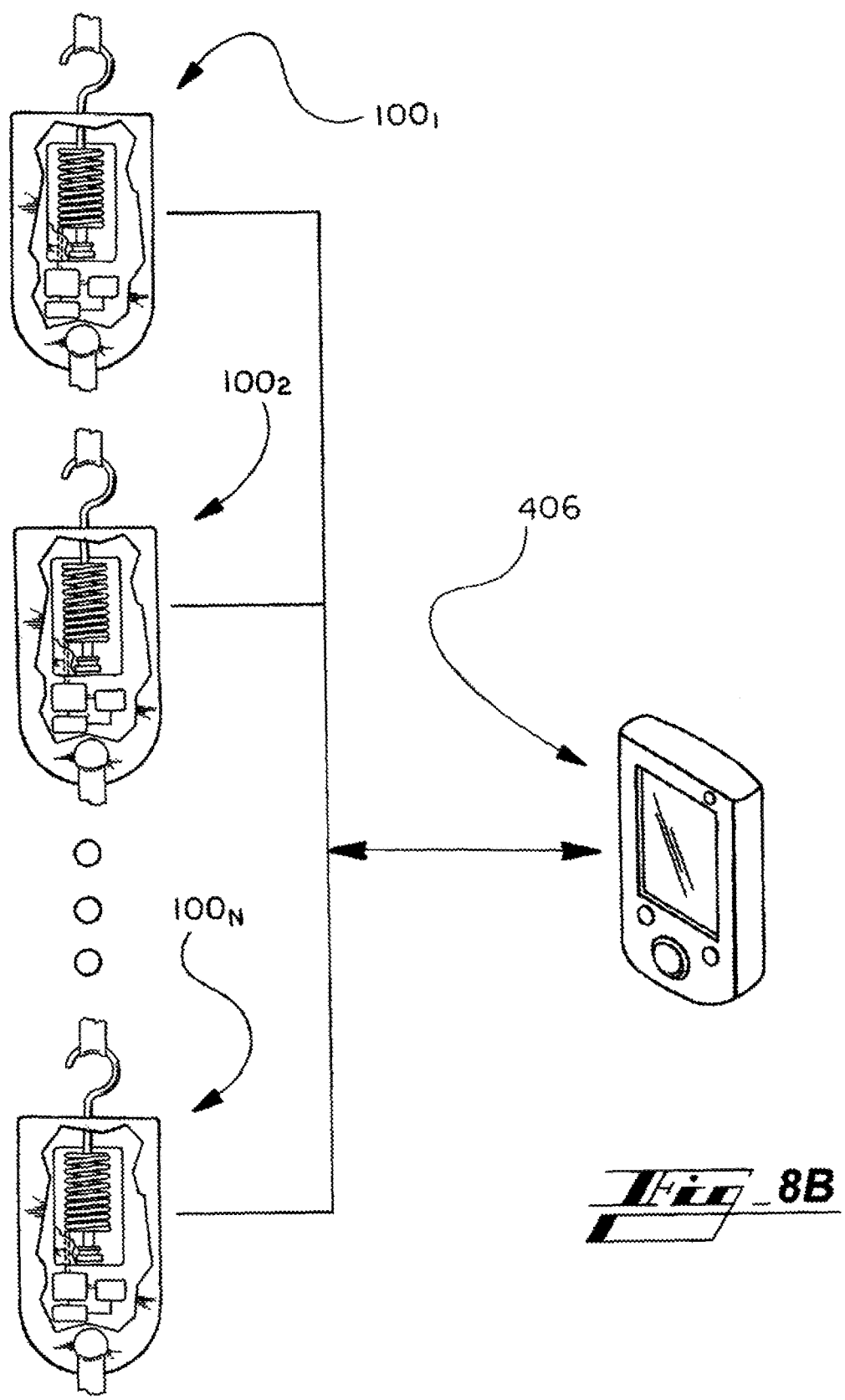
FIG. 8B shows an embodiment like FIG. 8A except with the transmitters being removed or integral to the securement sensor devices.

FIG. 8A shows schematically a second arrangement of components of a wireless electronic securement-monitoring system, comprising multiple securement sensor devices in communication with a single receiving computing device by way of multiple corresponding electronic transceiver, according to another embodiment of the present technology. FIG. 8B shows an embodiment like FIG. 8A except with the transmitters being removed or integral to the securement sensor devices.

FIG. 9 shows schematically a third arrangement of components of a wireless electronic securement-monitoring system, comprising multiple securement sensor device in communication with a single receiving computing device by way of single electronic transceiver, according to another embodiment of the present technology.

FIG. 10A shows schematically a fourth arrangement of components of a wireless electronic securing system, comprising a single securement sensor device in communication with multiple receiving computing devices $406_1$-$406_M$ by way of single electronic transceiver, according to another embodiment of the present technology. FIG. 10B shows an embodiment like FIG. 10A except with the transmitter being removed or integral to the securement sensor device.

Figure 11B:
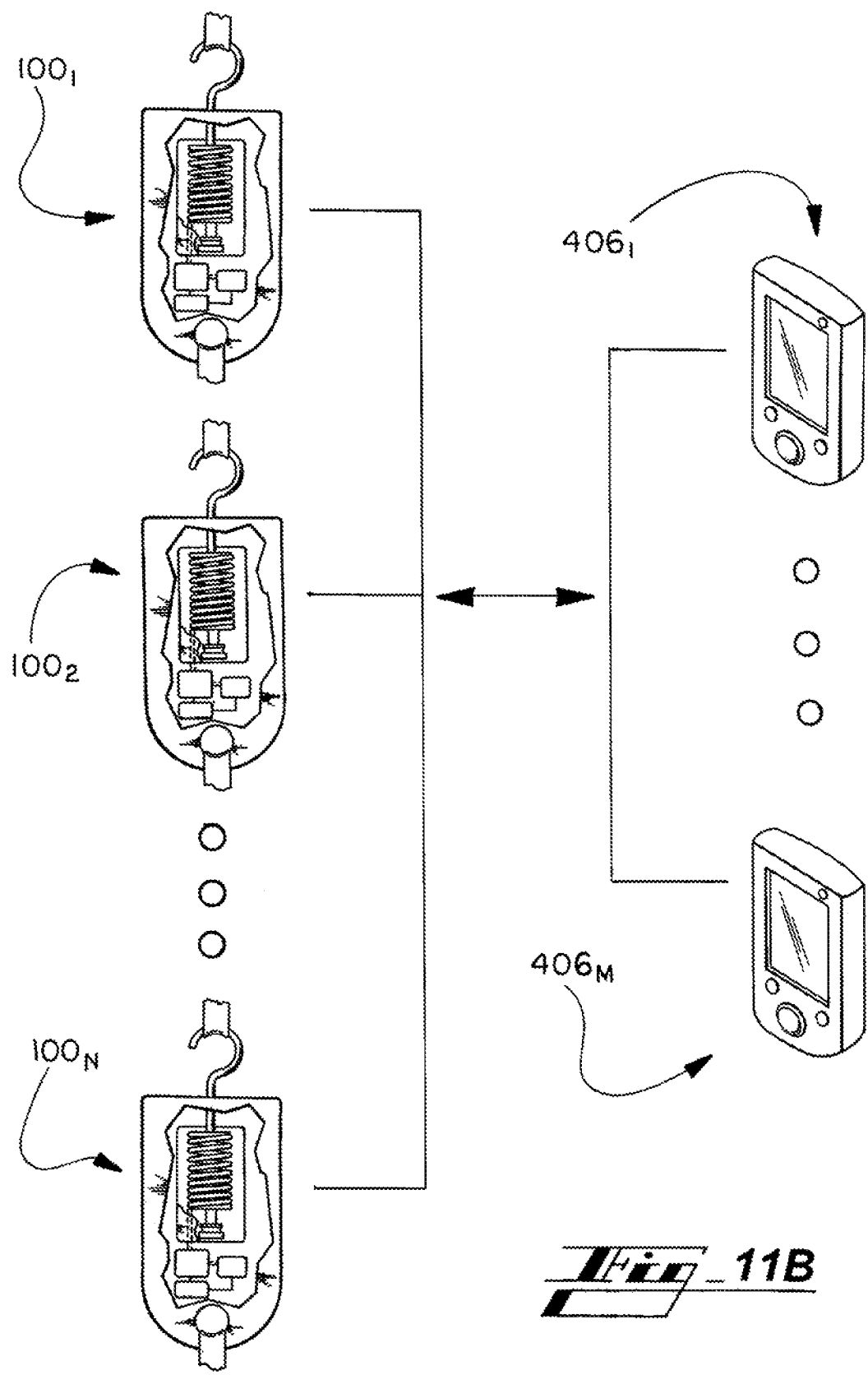
FIG. 11B shows an embodiment like FIG. 11A except with the transmitters being removed or integral to the securement sensor devices.

FIG. 11A shows schematically a fourth arrangement of components of a wireless electronic securing system, comprising multiple securement sensor devices $100_1$-$100_N$ in communication with multiple receiving computing devices $406_1$-$406_M$ by way of single electronic transceiver, according to another embodiment of the present technology. Sub-scripts N and M are used to indicate that the number of respective devices 100, 406 are not necessarily the same, though they can be in implementations. FIG. 11B shows an embodiment like FIG. 11A except with the transmitter being removed or integral to the securement sensor devices.

VII. FIG. 12—Algorithms/Methods of Operation

FIG. 12 illustrates example algorithms and methods of operating the present systems, outlined by flow chart as a method 1200, according to various embodiments of the present disclosure.

Functions include, but are not limited, to, monitoring a securement electronically, providing and receiving notifications regarding level of object security, advising a user regarding a positive or satisfactory status of the securement 110, and alerting a user or system regarding a negative status of the securement 110.

It should be understood that operations of the method 1200 are not necessarily presented in any particular order and that performance of some or all the operations in an alternative order is possible and is contemplated. The operations have been presented in the demonstrated order for ease of description and illustration. Operations can be added, omitted and/or performed simultaneously without departing from the scope of the appended claims. It should also be understood that the illustrated method 1200 can be ended at any time. In certain embodiments, some or all operations of this process, and/or substantially equivalent operations are performed by execution of computer-readable instructions, such as by one or more of the controllers or processors 514, 604 described above.

The computer-readable storage devices described herein in some embodiment comprise modules, as mentioned, such as the modules 608 mentioned, in which various segments of computer-executable code is stored for performing respective functions of the present technology. The modules 608 can be named accordingly. For an operation of evaluating a measured securement condition, such as a force measurement to determine whether the condition is outside of preferred limits, the remote server 404 and/or the destination device 406 can include a module 608 comprising code causing a processor of the server or device to perform the corresponding functions. The module 608 in this case can be referred to as a securement-condition evaluation module, a securement-sensor output review module, the like, or similar. The same format can be applied to each function, operation, or act described herein.

In the description of the method 1200, references to the securement sensor device 100 and other components are not limited to the particular embodiments shown in the drawings.

The method 1200 begins and flow proceeds to section 1202 representing by dashed line. The section 1202 can be referred to as a set-up stage, for example. The set-up stage 1202 comprises a step 1203 at which a user or specially-configured machine (e.g., automated or semi-autonomous machine or robot; not illustrated) connects the securement sensor device 100 to the securement 110, or otherwise orients the sensor device 100 with respect to the securement 110 so the device 100 can sense the securement 110 as needed.

For embodiments in which the securement sensor device 100 is already attached to the securement 110, such as at a factory or in a last use of the securement sensor device 100 in connection with the securement, this step 1203 would not be needed.

At step 1204, the user or specially-configured machine secures the object 116 using the securement 110 having the securement sensor device 100 attached. For embodiments in which an object is not secured, per se, the securement 110 and sensor device 100 are otherwise positioned as needed, such as for the sensor device 100 to monitor whether a sealed closure is fully closed.

At step 1206, the user, specially-configured machine, and/or a computerized device calibrates the securement sensor device 100 and/or the securement 110. In a mentioned embodiment, the calibrating includes changing an adjustment mechanism 512 such as the screw shown in FIG. 5. In one embodiment, for instance, a user may initiate a calibrating step using an application (app) operating at the destination device 406, such as at a mobile communication device (e.g., tablet, smart phone, laptop) or vehicle computer system, or the application can initiate the calibrating automatically or in response to a request or instruction, such as from the server 404.

At step 1208, user, specially-configured machine, and/or a computerized device sets the securement sensor device 100 to an active or monitoring mode. In various embodiments this step involves simply turning on the securement sensor device 100.

The calibrating 1206 is in most embodiments performed after turning the device on. The calibrating 1206 can involve adjusting the securement 110. For implementations in which a particular amount of tightening, securing, positioning, etc. of a securement 110 or object is needed, the system can be configured to allow the user, specially-configured machine, and/or computerized device to adjust the securement 110 until the securement sensor device 100 indicates that a preset or desired level of tightening or securing has been achieved. This embodiment can be helpful in numerous circumstances, such as when the object being secured is a person or a fragile item. While it would generally not matter if a securement 110 is over tightened over a robust object such as a palate bricks, it would be important to ensure that the securement 110 (e.g., child-seat seat belt) holding a baby or other fragile cargo is tight enough but not too tight.

The securement sensor device 100 and/or destination device 406 app can be configured to communicate to the user, specially-configured machine, and/or a computerized device that a proper level of securement, tightening, positioning, etc., has been reached. In one embodiment, the securement sensor device 100 has at least one light, such as a green light to indicate a desired condition and a red light to indicate an undesired condition, such as the securement 110 being outside of a pre-set condition level.

In one embodiment, the securement sensor device 100 comprises a speaker or other noise transducer to provide at least one audible sound to indicate when the securement 110 is properly and/or improperly secured.

In another embodiment, the securement sensor device 100 sends, directly or indirectly to the custom app of the destination device 406, a signal or a message indicating whether the securement 110 or object 116 is properly and/or improperly secured, positioned, etc.

Once the securement 110 is properly in place with the securement sensor device 100 connected thereto, flow proceeds to a monitoring stage 1210 of the method 1200.

A manner of monitoring can depend on the type of securement 110 and securement sensor device 100 being used.

Flow proceeds along path 1220 if the securement sensor device 100 is configured to determine only whether a condition exists, such as a sensor device 100 comprising an on/off switch, and not able to measure levels of securement outside of case/not the case.

Securement sensor devices 100 configured to monitor levels of the securement 110 beyond a binary level—e.g., on/off, tight enough/not tight enough, open/closed can be referred to as variable, or fine. A variable securement sensor device 100 can measure, for instance, an amount of tension pulling at the device 100 to a pre-set level of accuracy, and not just whether tension has fallen below or exceeded a threshold.

If the securement sensor device 100 is configured to determine a variable amount of securement, such as particular tension force levels, flow proceeds along path 1230. The spring-loaded linear potentiometer is an example of a variable sensor device.

In a contemplated embodiment, the securement sensor device 100 is configured with both types of sensors—on/off and variable. Flow in these cases can proceed along both paths 1220, 1230.

In a further contemplated embodiment, the securement sensor device 100 has both the on/off and variable functions and is configured to be changeable between functions selectively. The securement sensor device 100 can include a button or rocker for example by which a user, machine, or computing device can selectively change the device between the two. In one implementation, the optional modes or functions include on/off, variable, and both.

At step 1222, the securement sensor device 100 senses whether a connection is in a first state or a second state. If the first state is determined, flow proceeds along path 1224 to repeat or continue the sensing. If the second state, flow proceeds along path 1226.

If the second state, flow can also flow along paths 1226 and still 1224 to repeat or continue sensing operation.

In some embodiments, the first state is a default, or baseline state, and the second state is an alert or notification state. The first and second states can correspond to any of a wide variety of conditions of the securement 110 depending on the implementation. In one implementation, the first state corresponds to the securement being in a desired state, such as a secured, closed, tight, or properly-positioned, properly-moving, state. The second state in this implementation would be the securement 110 being loose—e.g., looser than a pre-set threshold value, such as a tension force threshold—mispositioned, etc.

In one implementation, a horticulturalist may integrate the securement sensor device 100 with securements 110 that are connected gently to numerous trees. The securement 110 can be used to facilitate needed straightening or other direction change of the trees, for example. Each securement 110 could start relatively taught, providing the needed bias. This condition would correspond to the first state. As the tree changes, the securement 110 could become looser until it falls to a threshold level of tension, or tighter as the tree grows straighter and taller. The securement sensor device 100 would follow path 1222, 1224 until a threshold, being higher or lower than an initial state, is sensed, and then flow would proceed along path 1226.

In a contemplated embodiment, the first, default state is loose, or open, and the second, notification state is tight, or closed. As an example, a horticulturalist may integrate the securement sensor device 100 with securements 110 that are connected to numerous small trees being monitored for growth. Each securement 110 would start with some slack in the first state and as the tree grows the securement 110 will become tighter until it reaches a threshold level of tension.

The securement sensor device 100 would follow path 1222, 1224 until the threshold is sensed, and then flow would proceed along path 1226.

Changes over time, such as tree growth, can also be monitored using a variable-sensing securement sensing device 100 (path 1230). The variable-sensing securement sensing device 100 in this case can be configured to measures changes in tension, or proximity, for instance. The variable-sensing securement sensing device 100 provides notification of the sensed characteristic when pre-set conditions are met, such as a change of tension outside of a baseline range or percentage away from a base tension.

At block 1232, the securement sensor device 100 senses or measures a characteristic of the securement 110. The sensing can be performed on any basis, such as continuously, intermittently or at intervals—e.g., at regular or pre-set levels. In a contemplated embodiment, the sensing is performed in response to an instruction or request, such as request from a server 404 or destination device 406.

Sensing less frequently results in a benefit of battery savings. The device 100 in some embodiments includes a timer to control timing of the sensing.

As mentioned, the securement 110 is not limited to being a system for securing an item, and the measurements of the securement sensor device 100 is not limited to measuring an amount of securing tension. As also mentioned, while the sensing described primarily herein comprises mechanical sensing, such as by way of a strain gauge, the device 100 is in other embodiments configured to sense state of a physical connection in other ways, such as by proximity sensing, light, camera, or laser-based sensing.

At diamond 1234, the securement sensor device 100 determines whether to send or initiate a report or notification in connection with a measurement taken by the device 100. In some embodiments, this decision 1234 is not present. Flow without this decision can be viewed to proceed along path 1236 of FIG. 12. The sensor device 100 can report values corresponding to measurements on another basis, such as continuously, intermittently, upon request, or other In some embodiments, the securement sensor device 100 determines whether value of a measurement taken qualifies to trigger a reporting or notification. A notification can be generated and sent and presented to a user via the custom securement-monitoring application at the destination device 406.

In cases of reporting values without being requested, a downstream device, such as the server 404 or the destination device 406, can determine whether a further reporting or notifying is appropriate based on the value of the securement state measured.

For this step, the securement sensor device 100 is in some embodiments configured—e.g., pre-programmed or otherwise configured—to determine whether a quantity or quality of a state measured is within or outside of a range. The range can be a desired, or default range, or an undesired, alert range.

In one implementation, the device 100 is configured to determine whether the state measured is below or above a threshold. The threshold can be set to correspond to a fail-state value, or to a value within a buffer region or percentage of the fail-state value. A fail-state value is not necessarily a state at which an element—e.g., securement or object secured—will fail. It can be a state for which the securement or monitored system is considered in an undesirable state. For instance, if a securement is considered secure and not too-tight if between X and Y Newtons (N), the threshold triggering reporting or notifying can be set at those values (X, Y).

Or if a securement is considered secure and not too-tight if is within a buffer amount of X and Y Newtons (N), the threshold triggering reporting or notifying can be set at those at those buffer values, such as at 10% of the range ends (X, Y).

If the securement sensor device 100 determines that a reporting or notification condition exists, flow proceeds along path 1238. If the securement sensor device 100 does not determine that a reporting or notification condition exists, flow proceeds along path 1239 to continue monitoring.

Flow can also proceed along path 1234 if the securement sensor device 100 does not determine that a reporting or notification condition exists. This function may be useful, for example, if a user or downstream device (e.g., server 404 or destination device 406 or application therein) wanted to know the current state of the securement 110, even if the securement is operating at a desired level or within desired bounds.

At paths 1226, 1236, 1238, the securement sensor device 100 generates and/or sends a signal or message indicating the securement condition sensed.

Dashed section 1240 indicates a reporting and notification stage. The functions of this stage 1240 can be performed by any one or more of multiple devices, such as the server device 404 or the destination device 406.

At blocks 1242, 1244, 1246 the performing device(s) performs any of a wide variety of processing operations. The operations can include, for instance, passing a signal or message received from the securement sensor device 100 on to another system or user. The server 404 could pass the signal or message onto a destination device 406—e.g., a user mobile phone. The destination device 406 can present the message or a notification corresponding to the message or signal to the user, such as by way of a display screen, speaker, or printout.

The notification can include, for instance, a green or red light, and/or provide an audible alert, indicating whether the subject securement is within or outside of preferred or required operating conditions.

The notification could also include a value of a securement condition, such as a value measured by a variable sensor device 100 and reported along path 1244 or 1246. The notification can include alert qualities, highlighting or calling out presence of a pre-set condition, such as the securement measurement being outside of preferred or required bounds.

The notification can also include an identification (e.g., Id. no.) of one or more subject securements. This would be useful when a device or user is monitoring multiple securements.

In a contemplated embodiment, the acting device(s)—e.g., server device 404 or the destination device 406, performs other operations using the signal or message received. The acting device(s) can, for instance, store data corresponding to the data received. The device(s) could later analyze such previously stored data. The analysis can be performed to identify trends, for instance, such as trends in changes in the securement 110 over time that may indicate that the securement should be replaced or changed. A history can also be analyzed to determine whether a system, such as the securement, or a user (e.g., vehicle driver) is operating or working (e.g., a driver driving) properly.

Dashed section 1250 represents an output stage. The output state 1250 includes block 1252 whereat output is provided to a device or user. The destination device 406 can perform the task. The output can include any of the notifications described herein, such as an alert message for a user.

Dashed section 1260 represents an action or reaction stage, comprising block 1262 whereat one or more actions are taken in response to the output of the prior stage(s) 1240, 1250. The actor can include one or more devices, such as the destination device 406 or the server 404, etc. The actor can include a user, such as a vehicle driver.

Example actions 1262 include a specially-configured machine such as the automated or semi-autonomous machine or robot mentioned, or a user, adjusting the securement 110. A forklift operator moving a load for which he received notification on a mobile device that the corresponding securement 110 is loose can, in response, repair, reset, replace, or otherwise adjust the securement 110.

As another example action 1262, an actor such as the server 404 or destination device 406, can generate, transmit, and/or present an instruction indicating a next step that should be taken. The instruction can request that a user receiving the instruction perform the adjustment mentioned in the preceding paragraph.

As still another example action 1262, the actor, such as the server 404 or destination device 406, can generate, transmit, and/or present a request. The request may be sent to the server 404 or securement device 100, for instance, and request information, approval, or instruction. The request can seek information such as a history of readings of the securement sensor device 100 over a period of time, such as the last ten minutes, the last hour, or the last day, for instance.

As yet another example action 1262, the actor can generate and/or send a notification message to another device. The server or the destination device 404, 406 could send a notification to a manager's mobile device or a manager's computer system, for instance.

As still another example action 1262, an actor, such as automated machinery at the securement sensor device 100, could determine or be instructed to perform a correction function, such as to tighten or otherwise adjust the securement as needed. Tightening, for instance, can be performed in one implementation, by tightening aspects of the securement sensor device 100. In one implementation, the tightening is performed by the actor tightening the securement 110. The system performing the tightening or other adjusting can include an actuator, motor, hydraulic components, or the like, for performing the adjustment. For embodiments in which a local adjustment is approved and/or instructed from a remote source, such as the securement application at the user device 406, the operation can be referred to as a remote adjustment, automated remote adjustment, or the like.

As another example action 1262, a first actor, such as the server 404 or destination device 406 can generate and/or send a request or prompt for receipt by a user. The request or prompt can indicate a need to correct an undesired state of the securement. The request or prompt can, for instance, prompt the user to approve automatic correction of the unwanted condition at the securement. In response to receiving the approval, the corrective action is initiated and subsequently performed. Again, the correction can be made by, for instance, automated machinery at the securement sensor device 100, such as to tighten the securement. And again, the operation can be referred to as a remote adjustment or the like.

The method 1200 can end 1263, or one or more aspects can be repeated, as indicated by way of examples by paths 1265 and 1267, returning flow to the first and second illustrated stages 1202, 1210, respectively. In a contemplated embodiment, functions include determining which path to begin the subsequent performance, as indicated by diamond between the paths 1265, 1267. The decision can determine, for example, whether a set-up/calibration operation is needed.

VIII. FIGS. 13-19—Alternative Embodiments

FIG. 13 illustrates an alternative embodiment of the present technology, in which the securement sensing device 1300 is a device configured to perform its functions without being tied in series, as shown in FIG. 1, with the straps 112, 114 used to secure the object 116. Instead, the sensing device 1300, when in use, is placed "in parallel" to the straps 112, 114, shown in FIG. 15 for instance.

The sensing device 1300, in one embodiment, has a U-shaped base 1302, which comprises a base plate with two opposing walls, one wall being on each side of the base plate. In various embodiments, each wall has multiple holes, such as three through holes 1310, 1312, 1314 as shown in FIG. 13 Each of a corresponding number of pins 1304, 1306, 1308 extends across the U-shaped base 1302 and has two ends inserted into the through holes 1310, 1312, 1314 of the opposing walls.

In one embodiment, a middle pin 1306 is preferably placed at a level above the two adjacent pins 1304, 1308.

One of the through holes, for instance, a middle through hole 1312 at which the middle pin 1306 rests, is equipped or associated with a sensor 1316. The sensor 1316 senses movement of the corresponding pin—e.g., the middle pin 1306. The sensor 1316 may have a construction similar to the device shown in FIG. 5, with a difference being that the force being measured in the embodiment of FIG. 13 is a compression force instead of a pulling force. Alternatively, the sensor 1316 may also be configured and arranged to measure a pulling force, such as by the sensor 1316 being equipped with a hook through which the corresponding (e.g., middle) pin 1306 is inserted and the sensor 1316 being placed on a side wall and above the position of the corresponding pin 1306.

FIG. 14 illustrates an exemplary use of the securement sensing device 1300 of FIG. 13. The strap 1402 has or is connected to a hook 1406 and the hook 1406 is attached to a local grounding body, such as a body of an automobile. In operation of the arrangement shown, the attachment is tight.

The strap 1402 passes between the base plate of the U-shaped base 1302 and the third pin 1308, wraps partially around the third pin 1308, and also passes over the middle pin 1306, wrapping partially around the middle pin 1306. Finally the strap 1402 passes between the base plate of the U-shaped base 1302 and the first pin 1304, wrapping partially around the third pin 1304.

As the other end of the strap 1402 is attached to the local grounding body, e.g., body of the automobile, and the strap 1402 is tightened, a pulling force 1408 is exerted on the strap 1402 and consequently a compression force 1404 is exerted on the middle pin 1306. This compression force 1404 exerts on the pin 1306, which is then measured by the sensor 1316. Note, if the sensor 1316 is placed above the middle pin 1306, the sensor 1316 will measure a pull-down force 1404. The intensity of the force 1404 depends on the angle $\phi$. The angle $\phi$ is not critical in the issuance of a warning because the warning is issued when the securement sensing device senses the difference between a detected pull-down force 1404 and a pull-down force stored upon reset.

FIG. 15 illustrates application of one or more securement sensing device on a cargo 1500 placed on a trailer 1502 to be hitched onto a truck. The securement sensing device 1300 may be used with other types of cargo securement. The cargo 1500 is secured onto the trailer 1502 by one or more straps 1504, 1506. One or more sensing devices 1508, 1510 are placed along the straps 1504, 1506. The sensing devices 1508, 1510 communicate with a destination device in a manner similar to that described above in connection with FIGS. 4, 7A, 7B, 8A, 8B, 9, 10A, 10B, 11A, and 11B.

FIG. 16 is another embodiment of the present technology. The securement sensing device in this embodiment comprises a body 1602 with a sensor 1604 disposed on the top of the body 1602 and two bars 1606, 1608, placed on or adjacent opposite walls of the body 1602. The securement sensing device may also have a reset switch 1614.

A securing strap 1610 wraps around the sensor 1604 and passes between the bars 1606, 1608 and the body 1602 and the strap 1610 exerts a downward force 1612, which will be sensed by the sensor 1604 and processed by equipment inside the body 1602. The reset switch 1614 resets the sensor 1604. The body 1602 can be placed on cargo with the base of the body 1602 in contact with the cargo or placed upside down with the top (the sensor) in contact with the cargo.

FIG. 17 is a schematic diagram or an arrangement 1700 including a sensor. The sensor element has a sensing element 1702, which can be mechanic or electrical. The measured signal is sent to a processor 1704. The processor 1704 is powered by a power source 1710 and communicates, via an external communication unit 1708, with a remote destination device similar to the remote destination device 406 described above. The external communication unit 1708 may communication by wired or wireless communications with the remote destination device 406. The sensor 1604 may also have a reset input unit 1706, which ca be configured for manual actuation to reset the sensor.

The sensor may measure the tension that the sensing element 1702 measures and alternatively may measure variation of tensions that the sensing element 1702 measures. When the sensor measures the variation of the tension, after the securement sensing device is tightly secured by the strap 1610 against a cargo, the reset input unit 1706 is pressed and the processor 1704 interprets the current tension sensed as the standard tension. During use, when the cargo is transported, vibrations may cause the securement sensing device to move to a different position or cause the strap to become loosen just slightly, thus altering the tension on the strap and the tension sensed by the sensing element 1702.

FIG. 18 illustrates a chart showing, between an x-axis of time 1810 and a y-axis of tension 1812, a variation of the sensed tension 1804. Initially, the sensed tension 1804 may be at level 1802. When the reset input unit 1706 is activated, the information on level 1802 is saved by the processor 1704. As the securement sensing device moves and adjusts to a new position during the transport, the sensed tension 1804 may vary as shown in FIG. 18 and may settle at a new level 1806. A difference 1808 of the tension between the level 1802 and the level 1806 is calculated by the processor 1704 (FIG. 17). If the difference exceeds a preset difference level or threshold, a communication is sent via the external communication unit 1708 (FIG. 17) to the remote destination device. In one embodiment, the preset difference level may be set either on the securement sensing device or received from the remote destination device.

FIG. 19 is a flowchart for a process 1900 for detecting variation in the tension detected by a securement sensing device. After a reset is detected, step 1902, the processor 1702 executing specially configured code or computer-executable instructions, sets the first tension level, step 1904, and starts to sense the tension.

To eliminate instantaneous variations in the tension, the processor 1702 may calculate an average for a set time period, for example, every 5 seconds, and assign this average as the second tension level, step 1906. The processor 1702 calculates the difference between the first tension level and the second tension level, step 1908. If the difference between the first tension level and the second tension level is larger than a preset difference level, step 1910, a warning signal is sent to the remote receiving device, step 1912. If the difference between the first tension level and the second tension level is not larger than the preset difference level, the securement sensing device continues to monitor the tension by repeating steps 1906, 1908, and 1910. When the remote receiving device receives the warning signal, the user may be notified by a graphical message, an audible alarm signal, and/or in any other suitable manner.

IX. Select Benefits of the Present Technology

Many of the benefits and advantages of the present technology are described above. The present section restates some of those and references some others. The benefits are provided by way of example, and are not exhaustive of the benefits of the present technology.

The present technology has multiple advantages over traditional approaches such as simply setting or inspecting securements visually and/or manually.

The present technology allows a user and/or automated system to confirm that they are setting or have set a securement in place appropriately. Users such as parents can be assured that they've set a seatbelt securement appropriately—not too tight or loose.

The present technology in embodiments also allows a user and/or automated system to accurately monitor a securement without having to be present at the securement. Users can thus better focus on other tasks. A driver of a vehicle carrying a load can focus on driving, for instance, and would be alerted immediately if the load is insecure.

The system also functions to keep secured objects from falling or otherwise moving undesirably.

Embodiments, including those having a server system 404, allow a computerized system or user to monitor a plurality of securements efficiently. A fleet operator can monitor a plurality of securements positioned on respective fleet trucks.

Companies appreciating the benefits of the technology, including safer securements (e.g., car seats, shipments) or safer user actions (e.g., driving), may require or promote use of the present technology. Use could be promoted by, for instance, offering rewards, discounts, or the like. An insurance company may offer discounts to companies or individuals using the system, for instance.

X. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A securement sensing device comprising:
a body having a top wall, a first wall, and a second wall, wherein the first wall and the second wall are opposite one another and the top wall extends between the first wall and the second wall;
a first bar attached to the first wall;
a second bar attached to the second wall; and
a sensor attached to the top wall, wherein the sensor is positioned on the top wall such that at least a portion of a height of the sensor extends above a height of a top edge of the first wall and a height of a top edge of the second wall;
wherein a strap passes between the first bar and the first wall, over the top edge of the first wall, over the sensor, over the top edge of the second wall, and between the second bar and the second wall such that tensioning of the strap moves the strap toward the top wall such that the strap exerts a force on the sensor; and
wherein the sensor is configured to sense the force exerted on the sensor by the strap in operation.

2. The securement sensing device of claim 1, wherein the sensor sends a signal corresponding to the force to a remote monitoring device.

3. The securement sensing device of claim 1, further comprising a reset switch configured and arranged in the securement sensing device to set a first force value, wherein the first force value is compared with a second force value measured by the sensor.

4. The securement sensing device of claim 1, wherein the sensor further comprises a sensing element, a processor, and an external communication unit.

5. The securement sensing device of claim 4, wherein the processor is configured to calculate a measured force for a preset time period based on the force measured by the sensor, compare the measured force with a preset force, and send a signal to a remote monitoring device if the measured force differs from the preset force by more than a predetermined value.

6. The securement sensing device of claim 1, wherein the sensor is configured to sense a compression force.

7. The securement sensing device of claim 4, wherein the external communication unit is configured to communicate wirelessly with a remote monitoring device.

8. The securement sensing device of claim 4, wherein the processor is configured to calculate a difference between forces sensed by the sensing element and, if the difference exceeds a preset level, send a communication to a remote monitoring device.

9. The securement sensing device of claim 4, wherein the processor is configured to calculate an average of forces measured by the sensing element during a set time period.

10. A securement sensing device comprising:
a base wall;
a first wall attached to the base wall;
a second wall attached to the base wall, the second wall opposing the first wall;
a first pin disposed between the first wall and the second wall;
a second pin disposed between the first wall and the second wall;
a third pin disposed between the first wall and the second wall, wherein the second pin and the third pin are closer to the base wall than the first pin; and
a sensor, wherein the first pin is configured to directly apply a force to the sensor, wherein the force is one of a compression force or a pulling force; and
wherein a strap passes under the second pin between the second pin and the base wall, over the first pin, and under the third pin between the third pin and the base wall, wherein tensioning of the strap applies a compression force to the first pin and the first pin directly applies the force to the sensor such that the sensor detects the force applied by the first pin.

11. The securement sensing device of claim 10, wherein the securement sensing device sends, to a remote monitoring device, a signal corresponding to the force detected.

12. The securement sensing device of claim 10, wherein the sensor further comprising a reset switch configured and arranged in the securement sensing device to set a first force value, wherein the first force value is compared with a second force value measured by the sensor.

13. The securement sensing device of claim 10, the sensor further comprises a sensing element, a processor, an external communication unit, and a reset switch.

14. The securement sensing device of claim 13, wherein the processor is configured to set a first force value at the securement sensing device when the reset switch is activated.

15. The securement sensing device of claim 13, wherein the processor is configured to calculate a measured force for a preset time period based on a force measured by the sensor, compare the measured force with a preset force, and send a signal to a remote monitoring device if the measured force differs from the preset force by more than a predetermined value.

16. The securement sensing device of claim 10, wherein the first pin is configured to apply a pulling force to the sensor.

17. The securement sensing device of claim 10, wherein the first pin is configured to apply a compression force to the sensor.

18. The securement sensing device of claim 13, wherein the processor is configured to calculate an average of forces measured by the sensing element during a set time period.

* * * * *